(12) United States Patent
Muck et al.

(10) Patent No.: US 11,634,051 B2
(45) Date of Patent: *Apr. 25, 2023

(54) KINETIC SEAT ASSEMBLIES FOR VEHICLES

(71) Applicant: Toyota Motor Engineering & Manufacturing North America, Inc., Plano, TX (US)

(72) Inventors: Todd Rupert Muck, Fowlerville, MI (US); Charles P. Patterson, New Boston, MI (US); Matthew R. Speck, Plymouth, MI (US); Peter J. Moegling, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,498

(22) Filed: Oct. 25, 2021

(65) Prior Publication Data

US 2022/0041081 A1 Feb. 10, 2022

Related U.S. Application Data

(63) Continuation of application No. 16/778,689, filed on Jan. 31, 2020, now Pat. No. 11,180,060.

(51) Int. Cl.
*B60N 2/42* (2006.01)
*B60N 2/427* (2006.01)
(Continued)

(52) U.S. Cl.
CPC ............ *B60N 2/504* (2013.01); *B60N 2/028* (2013.01); *B60N 2/20* (2013.01); *B60N 2/501* (2013.01);
(Continued)

(58) Field of Classification Search
CPC .......... B60N 2/028; B60N 2/20; B60N 2/501; B60N 2/503; B60N 2/507; B60N 2002/0212; B60N 2002/026
(Continued)

(56) References Cited

U.S. PATENT DOCUMENTS 3,140,118 A 7/1964 Chester
3,291,524 A 12/1966 Flint
(Continued)

FOREIGN PATENT DOCUMENTS

CN 104385952 A 3/2015
CN 206589735 U 10/2017
(Continued)

OTHER PUBLICATIONS

U.S. Appl. No. 16/778,689, filed Jan. 31, 2020, Todd Rupert Muck.

*Primary Examiner* — Rodney B White
(74) *Attorney, Agent, or Firm* — Dinsmore & Shohl LLP

(57) ABSTRACT

A kinetic seat assembly that rotates based on a force applied on an occupant seated therein is provided. The kinetic seat assembly includes a primary seat cushion frame, a primary seat back frame, a secondary seat cushion frame pivotally connected to the primary seat cushion frame, and a secondary seat back frame pivotally connected to the primary seat back frame. The kinetic seat assembly further includes a front pivot mechanism for damping movement between the primary seat cushion frame and the secondary seat cushion frame in a kinetic seat vertical direction, and an upper pivot mechanism for damping movement between the primary seat back frame and the secondary seat back frame in a kinetic seat longitudinal direction.

20 Claims, 15 Drawing Sheets

(51) Int. Cl.
  *B60N 2/50* (2006.01)
  *B60N 2/54* (2006.01)
  *B60N 2/20* (2006.01)
  *B60N 2/02* (2006.01)
  *B60N 2/52* (2006.01)

(52) U.S. Cl.
  CPC ............ *B60N 2/503* (2013.01); *B60N 2/522* (2013.01); *B60N 2/54* (2013.01); *B60N 2/507* (2013.01); *B60N 2002/022* (2013.01); *B60N 2002/026* (2013.01); *B60N 2002/0212* (2013.01)

(58) Field of Classification Search
  USPC ............................ 297/216.1, 216.13, 216.14
  See application file for complete search history.

(56) References Cited

U.S. PATENT DOCUMENTS

| | | | |
|---|---|---|---|
| 4,423,848 A | 1/1984 | Mazelsky | |
| 4,662,597 A | 5/1987 | Uecker et al. | |
| 5,324,095 A | 6/1994 | Yamauchi | |
| 5,395,089 A | 3/1995 | Yamauchi et al. | |
| 5,468,045 A | 11/1995 | Weber | |
| 5,520,440 A | 5/1996 | Lee | |
| 5,652,704 A | 7/1997 | Catanzarite | |
| 5,722,722 A | 3/1998 | Massara | |
| 5,772,280 A | 6/1998 | Massara | |
| 6,019,424 A | 2/2000 | Ruckert et al. | |
| 6,135,561 A | 10/2000 | Kruger et al. | |
| 6,382,717 B1 | 5/2002 | Yasui et al. | |
| 6,585,318 B1 | 7/2003 | Tal | |
| 7,008,015 B2 | 3/2006 | Bischoff | |
| 7,883,072 B2 | 2/2011 | Kondo et al. | |
| 8,585,142 B2 | 11/2013 | Jamele et al. | |
| 8,714,642 B2 | 5/2014 | Lamparter et al. | |
| 9,045,058 B2 | 6/2015 | Katoh et al. | |
| 9,096,147 B2 | 8/2015 | Kulkarni et al. | |
| 9,499,077 B2 | 11/2016 | Lamparter et al. | |
| 9,802,513 B2 | 10/2017 | Katoh et al. | |
| 9,950,646 B2 | 4/2018 | Katoh et al. | |
| 9,975,458 B2 | 5/2018 | Takeuchi et al. | |
| 10,086,728 B2 | 10/2018 | White et al. | |
| 10,239,421 B2 | 3/2019 | Katoh | |
| 10,293,718 B1 | 5/2019 | Ilievski et al. | |
| 10,682,938 B2 | 6/2020 | Katoh | |
| 11,084,403 B1* | 8/2021 | Muck | B60N 2/68 |
| 11,180,060 B2* | 11/2021 | Muck | B60N 2/501 |
| 2001/0038233 A1 | 11/2001 | Eklind | |
| 2010/0231013 A1 | 9/2010 | Schlenker | |
| 2013/0328364 A1 | 12/2013 | Cecinas | |
| 2014/0216241 A1 | 8/2014 | Lamparter et al. | |
| 2014/0216242 A1 | 8/2014 | Lamparter et al. | |
| 2015/0343924 A1 | 12/2015 | Takeuchi et al. | |
| 2017/0320407 A1 | 11/2017 | Koike | |
| 2018/0072187 A1 | 3/2018 | Katoh et al. | |
| 2019/0111816 A1 | 4/2019 | Katoh | |
| 2019/0193610 A1 | 6/2019 | Ketels et al. | |
| 2019/0193611 A1 | 6/2019 | Ketels et al. | |
| 2019/0202324 A1 | 8/2019 | Ketels et al. | |
| 2019/0255976 A1 | 8/2019 | Katoh et al. | |
| 2020/0086776 A1 | 3/2020 | Nagai et al. | |
| 2020/0139916 A1 | 5/2020 | Nagai et al. | |
| 2021/0237629 A1* | 8/2021 | Muck | B60N 2/39 |

FOREIGN PATENT DOCUMENTS

| | | |
|---|---|---|
| FR | 687271 A | 8/1930 |
| FR | 3086603 B1 | 4/2020 |
| GB | 1242386 A | 8/1971 |
| JP | H08301056 A | 11/1996 |
| JP | 2007091175 A | 4/2007 |
| JP | 4463758 B2 | 5/2010 |
| WO | 2018234480 A1 | 12/2018 |

\* cited by examiner

FIG. 13
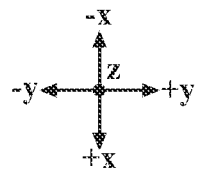
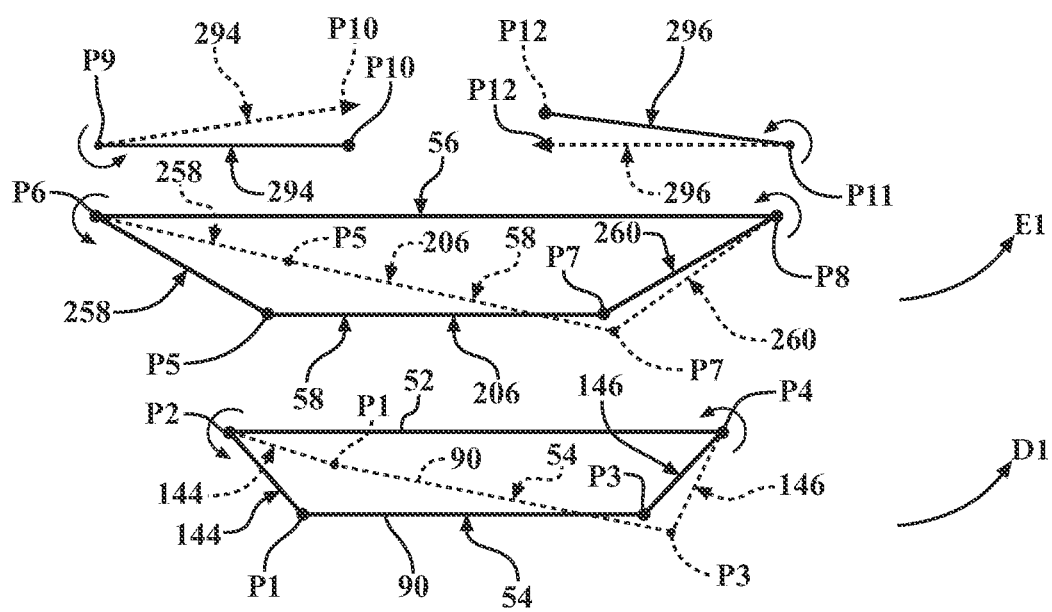
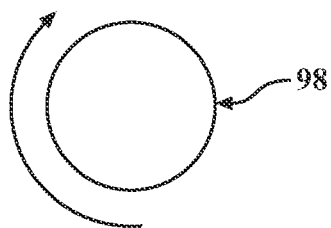

FIG. 15
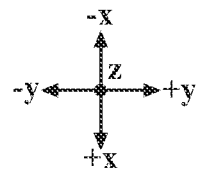
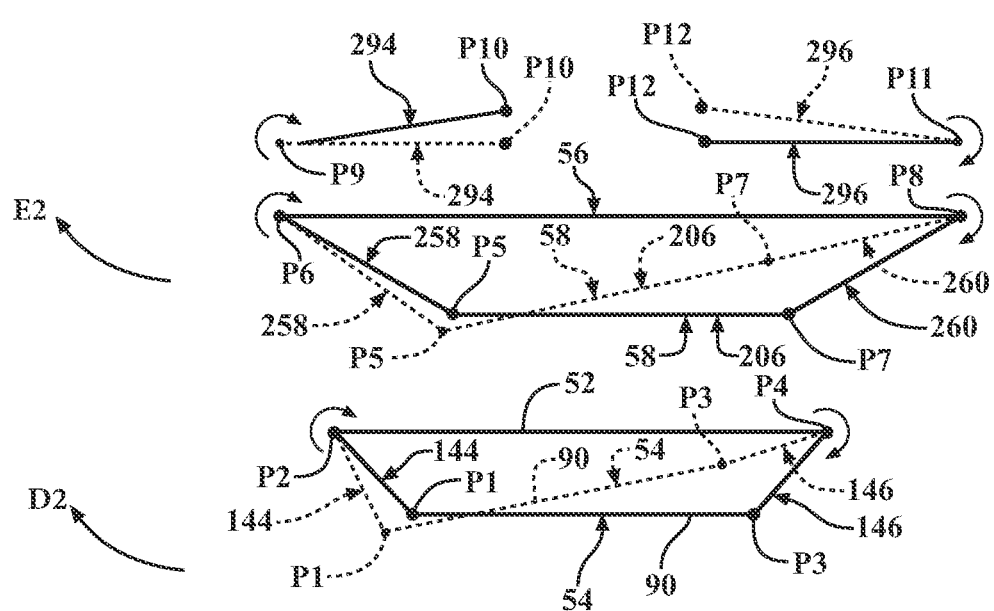
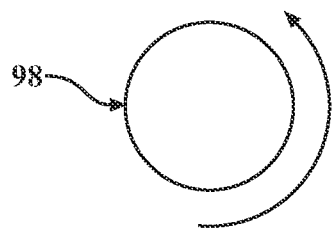

KINETIC SEAT ASSEMBLIES FOR VEHICLES

CROSS-REFERENCE TO RELATED APPLICATION

This application claims priority to U.S. patent application Ser. No. 16/778,689, filed Jan. 31, 2020, now U.S. Pat. No. 11,180,060, for "KINETIC SEAT ASSEMBLIES FOR VEHICLES," which is hereby incorporated by reference in its entirety including the drawings.

TECHNICAL FIELD

The present specification generally relates to kinetic seat assemblies for vehicles and, more specifically, kinetic seat assemblies for vehicles that accommodate rotation of an occupant's body during turning operations with a force applied in a counter-turning direction.

BACKGROUND

When driving a vehicle, the driver typically experiences fatigue due to repeated rotation of the driver's torso and pelvis. In addition, a driver's knees and head are also rotated during turning of the vehicle. Thus, this movement causes the driver to continuous have to compensate for rotation during turning. Over time, this rotation of the driver's torso, pelvis, knees, and head can lead to various aches and pains limiting the amount of driving time one can withstand.

It has been known to provide a seat assembly including a seat back and a seat cushion that mimic the walking movement of an occupant's pelvis and torso. Specifically, the known seat assembly allows the seat cushion to pivot at a cushion pivot axis and the seat back to pivot at a seat back pivot axis such that the seat back and the seat cushion pivot in opposite directions. However, rotating the pelvis and the torso in opposite directions during turning may cause discomfort in some drivers.

Accordingly, a need exists for alternative kinetic seat assemblies that offer torso rotation and pelvic rotation in the same direction to maintain a centered position of the driver's head and knees.

SUMMARY

In one embodiment, a kinetic seat assembly includes a primary seat cushion frame, a primary seat back frame, a secondary seat cushion frame pivotally connected to the primary seat cushion frame, and a secondary seat back frame pivotally connected to the primary seat back frame. The kinetic seat assembly further includes a front pivot mechanism for damping movement between the primary seat cushion frame and the secondary seat cushion frame in a kinetic seat vertical direction, and an upper pivot mechanism for damping movement between the primary seat back frame and the secondary seat back frame in a kinetic seat longitudinal direction.

In another embodiment, a vehicle includes a passenger compartment and a kinetic seat assembly within the passenger compartment. The kinetic seat assembly includes a primary seat cushion frame, a primary seat back frame, a secondary seat cushion frame pivotally connected to the primary seat cushion frame, and a secondary seat back frame pivotally connected to the primary seat back frame. The kinetic seat assembly further includes a front pivot mechanism for damping movement between the primary seat cushion frame and the secondary seat cushion frame in a kinetic seat vertical direction, and an upper pivot mechanism for damping movement between the primary seat back frame and the secondary seat back frame in a kinetic seat longitudinal direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 13 schematically depicts a top view of the movable pivots of the kinetic seat assembly of FIG. 1 during a right turn, according to one or more embodiments shown and described herein, during a right turn operation;

FIG. 15 schematically depicts a top view of the movable pivots of the kinetic seat assembly of FIG. 1 during a left turn, according to one or more embodiments shown and described herein, during a left turn operation.

DETAILED DESCRIPTION

Figure 1:
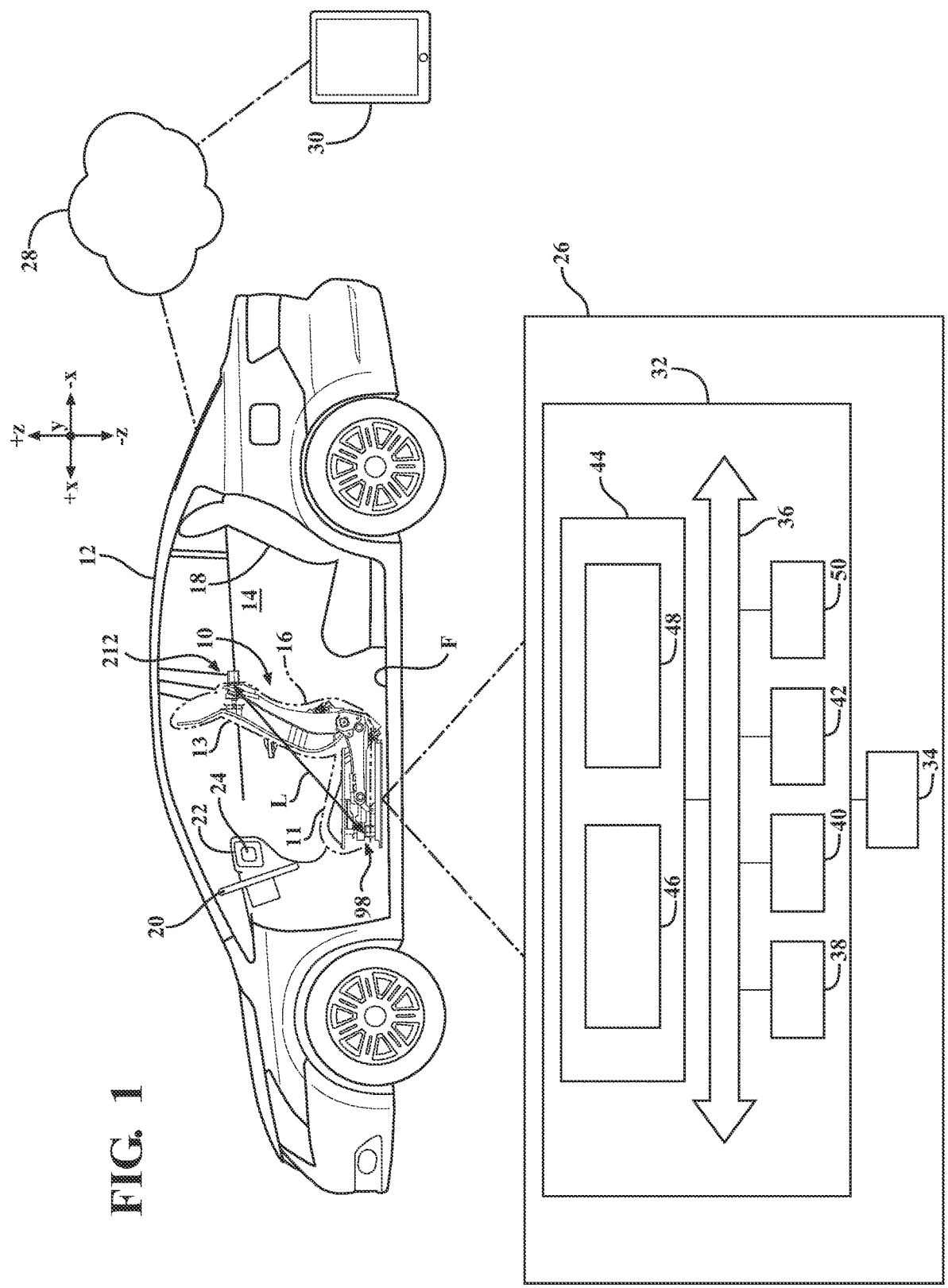
FIG. 1 schematically depicts a system for a vehicle having kinetic seat assembly, according to one or more embodiments shown and described herein, and illustrated in a vehicle as a driver's seat.

FIG. 1 generally depicts an environmental view of an embodiment of a vehicle including a kinetic seat assembly. The vehicle general comprises a passenger compartment which passengers or other occupants occupy. A plurality of vehicle seats including a front driver seat, front passenger seat, and one or more rear passenger seats may be provided within the passenger compartment of the vehicle.

As shown, the kinetic seat assembly is utilized as the driver's seat. However, it is to be understood that a plurality of kinetic seat assemblies may be utilized as multiple seats of the vehicle. The kinetic vehicle seat assembly generally comprises a kinetic seat cushion assembly and a kinetic seat back assembly. The kinetic seat cushion assembly includes a primary seat cushion frame, a secondary seat cushion frame, a seat cushion tilt mechanism coupling the secondary seat cushion frame to the primary seat cushion frame such that the secondary seat cushion frame is movable with respect to the primary seat cushion frame, and a front pivot mechanism that pivotally couples a front portion of the primary seat cushion frame to a front portion of the secondary seat cushion frame. The kinetic seat back assembly includes a primary seat back frame, a secondary seat back frame, a seat back tilt mechanism coupling the secondary seat back frame to the primary seat back frame such that the secondary seat back frame is movable with respect to the primary seat back frame, and an upper pivot mechanism that pivotally couples an upper portion of the primary seat back frame to an upper portion of the secondary seat back frame.

The front pivot mechanism provides a damping effect between a front portion of the primary seat cushion frame and a front portion of the secondary seat cushion frame. The seat cushion tilt mechanism allows a rear portion of the secondary seat cushion frame to tilt with respect to the primary seat cushion frame. The front pivot mechanism and the seat cushion tilt mechanism also allow the secondary seat cushion frame to rotate with respect to the primary seat cushion frame.

Similarly, the upper pivot mechanism provides a damping effect between an upper portion of the primary seat back frame and an upper portion of the secondary seat back frame. The seat back tilt mechanism allows a lower portion of the secondary seat back frame to tilt with respect to the primary seat back frame. The upper pivot mechanism and the seat back tilt mechanism also allow the secondary seat back frame to rotate with respect to the primary seat back frame.

During a turning operation, the occupant and the kinetic seat assembly receive a force pushing the occupant and the kinetic seat assembly in an opposite direction of the turning operation. Thus, the pivot mechanisms and the tilt mechanisms cause the secondary seat cushion frame and the secondary seat back frames to rotate in the direction of the force and in phase with one another. As used herein, the term "in phase" describes two objects, for example, the secondary seat cushion frame and the secondary seat back frame, moving synchronously with one another in the same direction. As such, the term "out of phase" as used herein describes two objects, for example, the secondary seat cushion frame and the secondary seat back frame, not moving synchronously and in the same direction with one another. Further, it should be understood that when two objects are moving in phase with one another, the directions in which those object are moving are similarly in phase with one another.

In some embodiments, each of the pivot mechanisms and the tilt mechanisms are manually adjustable in order to increase or decrease the amount of movement of the secondary seat cushion frame and/or the secondary seat back frame.

In some embodiments, the vehicle includes a display unit and a user interface. The vehicle also includes an onboard computing device including an electronic control unit having a processor and a memory component. Thus, the pivot mechanisms and the tilt mechanisms are each operable by an occupant of the vehicle by operating controls on the user interface. In some embodiments, the electronic control unit also includes a network interface hardware configured to interface with a transceiver to connect to a network. The network couples the vehicle to a mobile computing device in order to allow an occupant to control the pivot mechanisms and the tilt mechanisms wirelessly.

As used herein, the term "vehicle longitudinal direction" refers to the forward-rearward direction of the vehicle (i.e., in the +/−vehicle X direction depicted in FIG. 1). The term "vehicle lateral direction" refers to the cross-vehicle direction (i.e., in the +/−vehicle Y direction depicted in FIG. 1), and is transverse to the vehicle longitudinal direction. The term "vehicle vertical direction" refers to the upward-downward direction of the vehicle (i.e., in the +/−vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings. Further, the term "outboard" or "outward" as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard," and "outward" refer may be mirrored about the vehicle centerline when evaluating components positioned along opposite sides of the vehicle.

As used herein, the term "kinetic seat vertical direction" refers to the same direction as the vehicle vertical direction. In a configuration in which the kinetic seat assembly is a normal, front-facing seat in a vehicle, the term "kinetic seat longitudinal direction" refers to a direction parallel to the vehicle longitudinal direction. However, it should be appreciated that other configurations are contemplated in which the kinetic seat assembly is oriented in a direction in which the kinetic seat longitudinal direction is perpendicular, i.e., parallel to the vehicle lateral direction, or some other direction therebetween.

Also used herein, a direction expressed as clockwise or counterclockwise around the X-axis in a rolling direction is expressed from the perspective of a front view from the positive X direction. A direction expressed as clockwise or counterclockwise around the Y-axis in a pitch direction is expressed from the perspective of a right side view from the positive Y direction. A direction expressed as clockwise or counterclockwise around the Z-axis in a yaw direction is expressed from the perspective of a top view from the positive Z direction. Furthermore, it is to be understood that the "turning direction" means a direction in which the occupant is turning the vehicle. Similarly, "counter-turning direction" means a direction opposite the turning direction.

Reference will now be made in detail to various embodiments of the kinetic seat assembly described herein, examples of which are illustrated in the accompanying drawings. Whenever possible, the same reference numerals will be used throughout the drawings to refer to the same or like parts.

Referring to FIG. 1, a vehicle is generally illustrated at 12. The vehicle 12 includes a passenger compartment 14 provided in an interior thereof. The passenger compartment 14 is a portion of an interior of the vehicle 12 which passengers or other occupants occupy. A plurality of vehicle seats including a driver seat 16, front passenger seat (not shown), and one or more rear passenger seats 18, such as second row passenger seats or third row passenger seats, are provided within the passenger compartment 14 of the vehicle 12.

In FIG. 1, the driver seat 16 is provided as a kinetic seat assembly 10. However, the kinetic seat assembly 10 is not limited to the driver seat 16. In embodiments, any one or any combination of the driver seat 16, the passenger seat, and the one or more rear passenger seats 18 may be provided as the kinetic seat assembly 10.

In FIG. 1, the vehicle 12 is provided as an automobile which includes coupes, sedans, minivans, trucks, crossovers, hybrids, and sports utility vehicles. However, the kinetic seat assembly 10 is not limited to automobiles. In embodiments, the kinetic seat assembly 10 may be provided in any vehicle 12 such as a watercraft, aircraft, or the like.

The vehicle 12 includes a steering wheel 20 located in front of the driver seat 16 in the vehicle longitudinal direction. The vehicle 12 includes a display unit 22 and a user interface 24. In some embodiments, the user interface 24 includes manual buttons or touchscreen controls provided on the display unit 22. It is appreciated, that the vehicle 12 in which the kinetic seat assembly 10 is provided may be an autonomous vehicle in which no steering wheel 20 is provided.

The vehicle 12 includes an onboard computing device 26. In some embodiments, a network 28 couples the vehicle 12 to a mobile computing device 30. The network 28 may include a wide area network, such as an internet or cellular network (such as 3G, 4G, 4G LTE, WiMAX, etc.). Similarly, the network 28 may include a local area network, such as a wireless fidelity (Wi-Fi) network, a Bluetooth network, a near field communication network, hardware, and the like.

The onboard computing device 26 of the vehicle 12 includes an electronic control unit 32. In some embodiments, the onboard computing device 26 includes a transceiver 34 in electrical communication with the electronic control unit 32 and configured for two way communication with the network 28 to couple the vehicle 12 to the network 28 and, thus, the mobile computing device 30.

The mobile computing device 30 may be configured as a mobile phone, a tablet, a personal computer, and/or other devices for performing the functionality described herein. The mobile computing device 30 may be operated by a third party such as a driver or other occupant or owner of the vehicle 12.

Still referring to FIG. 1, the electronic control unit 32 includes a local interface 36, a processor 38, an input/output hardware 40, a data storage component 42, and a memory component 44 coupled to the processor 38.

The local interface 36 is implemented as a bus or other communication interface to facilitate communication among the components of the electronic control unit 32. The local interface 36 is formed from any medium that is configured to transmit a signal. As non-limiting examples, the local interface 36 is formed of conductive wires, conductive traces, optical waveguides, or the like. The local interface 36 may also refer to the expanse in which electromagnetic radiation and their corresponding electromagnetic waves traverses. Moreover, the local interface 36 may be formed from a combination of mediums configured to transmit signals. In one embodiment, the local interface 36 comprises a combination of conductive traces, conductive wires, connectors, and buses that cooperate to permit the transmission of electrical data signals to and from the various components of the mobile computing device 30. Additionally, it is noted that the term "signal" means a waveform (e.g., electrical, optical, magnetic, mechanical or electromagnetic) configured to travel through a medium, such as DC, AC, sinusoidal-wave, triangular-wave, square-wave, vibration, and the like.

The processor 38 may include processing components operable to receive and execute machine-readable instructions, such as those stored in the data storage component 42 and/or the memory component 44. As a non-limiting example, the processor 38 may be one of a shared processor circuit, dedicated processor circuit, or group processor circuit.

The input/output hardware 40 may refer to a basic input/output system (BIOS) that interacts with hardware of the vehicle 12, the mobile computing device 30, drivers that interact with particular devices of the vehicle 12 or the mobile computing device 30, one or more operating systems, user applications, background services, background applications, etc. In some embodiments, the input/output hardware 40 includes the display unit 22, the user interface 24, and/or the other hardware in the vehicle 12.

The data storage component 42 is communicatively coupled to the processor 38. As a non-limiting example, the data storage component 42 may include one or more database servers that support NoSQL, MySQL, Oracle, SQL Server, NewSQL, or the like. The data storage component 42 stores user-specific parameters and characteristics for desired operating modes of the kinetic seat assembly 10.

The memory component 44 is communicatively coupled to the processor 38. As a non-limiting example, the memory component 44 may be one of a shared memory circuit, dedicated memory circuit, or group memory circuit. The memory component 44 stores detection logic 46 and communication logic 48. The detection logic 46 and the communication logic 48 may each include a plurality of different pieces of logic, each of which may be embodied as a computer program, firmware, and/or software/hardware.

The detection logic 46 is executable by the processor 38 to detect one or more signals provided by the input/output hardware 40, such as the user interface 24. The communication logic 48 is executable by the processor 38 to cause the onboard computing device 26 to execute commands and operations corresponding to the detection logic 46. In some embodiments, the detection logic 46 and the communication logic 48 communicate with the network 28 through a network interface hardware 50 and/or the transceiver 34 to communicate with the mobile computing device 30.

In some embodiments, the memory component 44 is configured as volatile and/or nonvolatile memory and, as such, may include random access memory (SRAM, DRAM, and/or other types of RAM), flash memory, secure digital (SD) memory, registers, compact discs, digital versatile discs (DVD), and/or other types of non-transitory computer readable mediums. Depending on the particular embodiments, these non-transitory computer readable mediums may reside within the onboard computing device 26 and/or external to the onboard computing device 26. The memory component 44 and the data storage component 42 operate as the memory unit of the electronic control unit 32.

As noted above, in some embodiments, the electronic control unit 32 includes a network interface hardware 50. The network interface hardware 50 may include or be configured to interface with the transceiver 34 to connect to the network 28. As an example, the network interface hardware 50 is operable to communicate with any wired or wireless network hardware, including an antenna, a modem, a LAN, wireless fidelity (Wi-Fi) card, WiMAX card, mobile communications hardware, and/or other hardware for communicating with other networks and/or devices. From this connection, communication is made through the transceiver 34 using the network interface hardware 50 thereby facilitating communication between the electronic control unit 32 and the mobile computing device 30 through the network 28.

It should be understood that while the components discussed above are illustrated as residing within the electronic control unit 32, this is merely an example thereof. In some embodiments, one or more of the components may reside external to the electronic control unit 32. It should also be understood that while the electronic control unit 32 is illustrated as a single device, this is also merely an example. In some embodiments, the detection logic 46 and the communication logic 48 may reside on different computing devices. As an example thereof, one or more of the functionalities and/or components described herein may be provided by the mobile computing device 30, which may be coupled to the vehicle 12 through the network 28.

Figure 2:
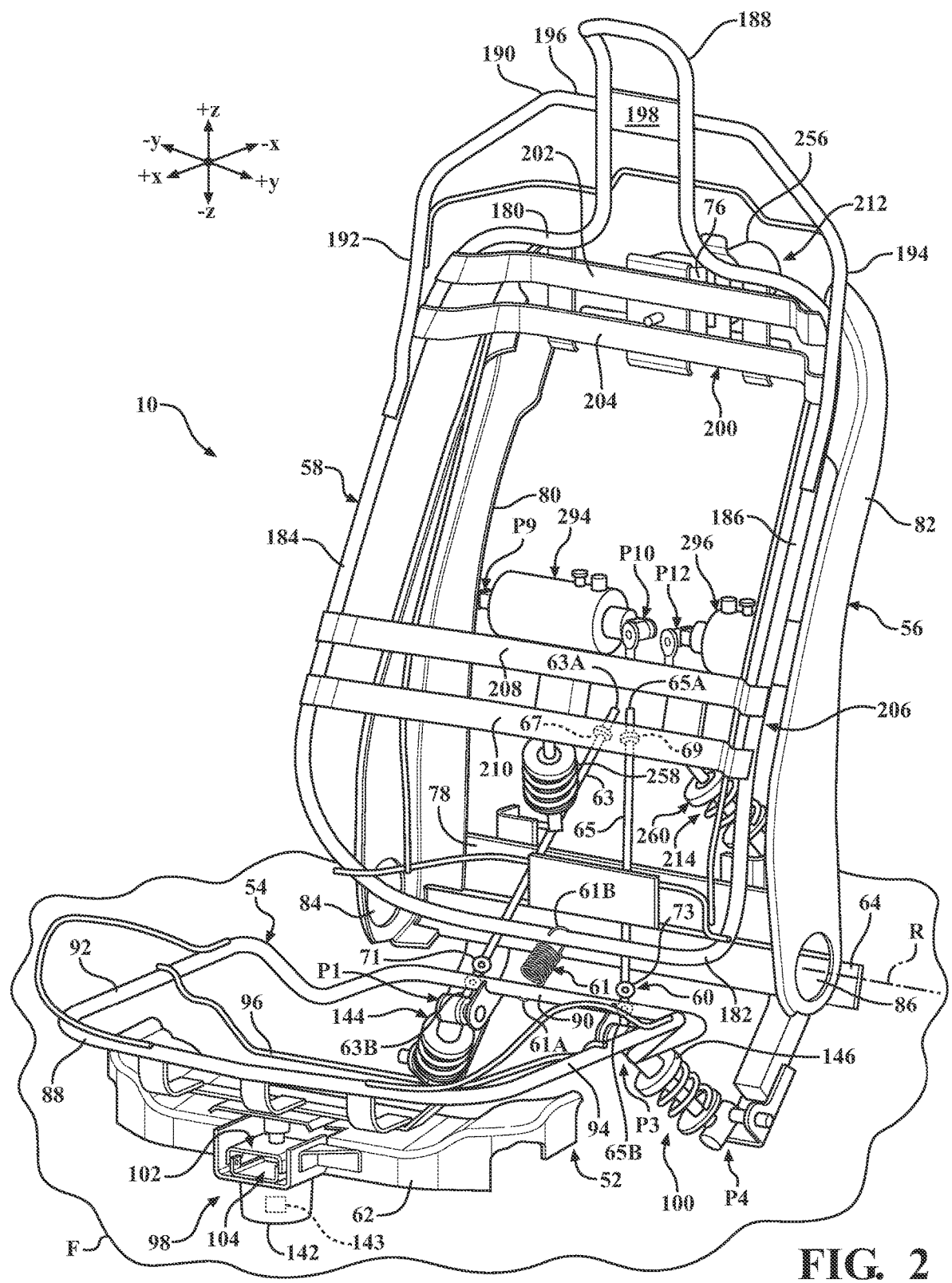
FIG. 2 schematically depicts a front perspective view of the kinetic seat assembly of FIG. 1, according to one or more embodiments shown and described herein.

Referring now to FIGS. 2-5, the kinetic seat assembly 10 is schematically shown and generally includes a primary seat cushion frame 52, a secondary seat cushion frame 54 pivotally connected to the primary seat cushion frame 52, a primary seat back frame 56, a secondary seat back frame 58 pivotally connected to the primary seat back frame 56, and a linkage member 60. As shown in FIG. 2, the linkage member 60 interconnects the secondary seat cushion frame 54 and the secondary seat back frame 58. The linkage member 60 is configured to inhibit the secondary seat cushion frame 54 and the secondary seat back frame 58 from moving out of phase with one another. It is to be understood that movement of the secondary seat cushion frame 54 and the secondary seat back frame 58 is caused by rotation of the occupant seated within the kinetic seat assembly 10 due to a force exhibited on the occupant and the vehicle 12 during driving. Thus, it should be appreciated that the movement of the secondary seat cushion frame 54 and the secondary seat back frame 58 is not a result of any motorized or otherwise electronically programmed and controlled operation. Various embodiments of the kinetic seat assembly 10 and the operation of the kinetic seat assembly 10 will be described in more detail herein.

It should be appreciated that, as shown in FIG. 1, the secondary seat cushion frame 54 includes padding 11 to support a pelvis, such as a buttocks and thighs, of an occupant, and that the secondary seat back frame 58 includes padding 13 to support a back of the occupant. The padding 11, 13 on the secondary seat cushion frame 54 and the secondary seat back frame 58 are omitted in the remaining figures to better illustrate the embodiments. Additional features are provided in embodiments of the kinetic seat assembly 10, although not shown, include, but are not limited to, lumbar support, adjustable headrest, built-in heating and cooling ventilation elements, massage controls, and the like.

The primary seat cushion frame 52 may have a generally rectangular shape. The primary seat cushion frame 52 includes a front member 62 provided proximate a front portion thereof and a rear member 64 provided proximate a rear portion thereof interconnected by a pair of opposing side members 66, 68.

Figure 3:
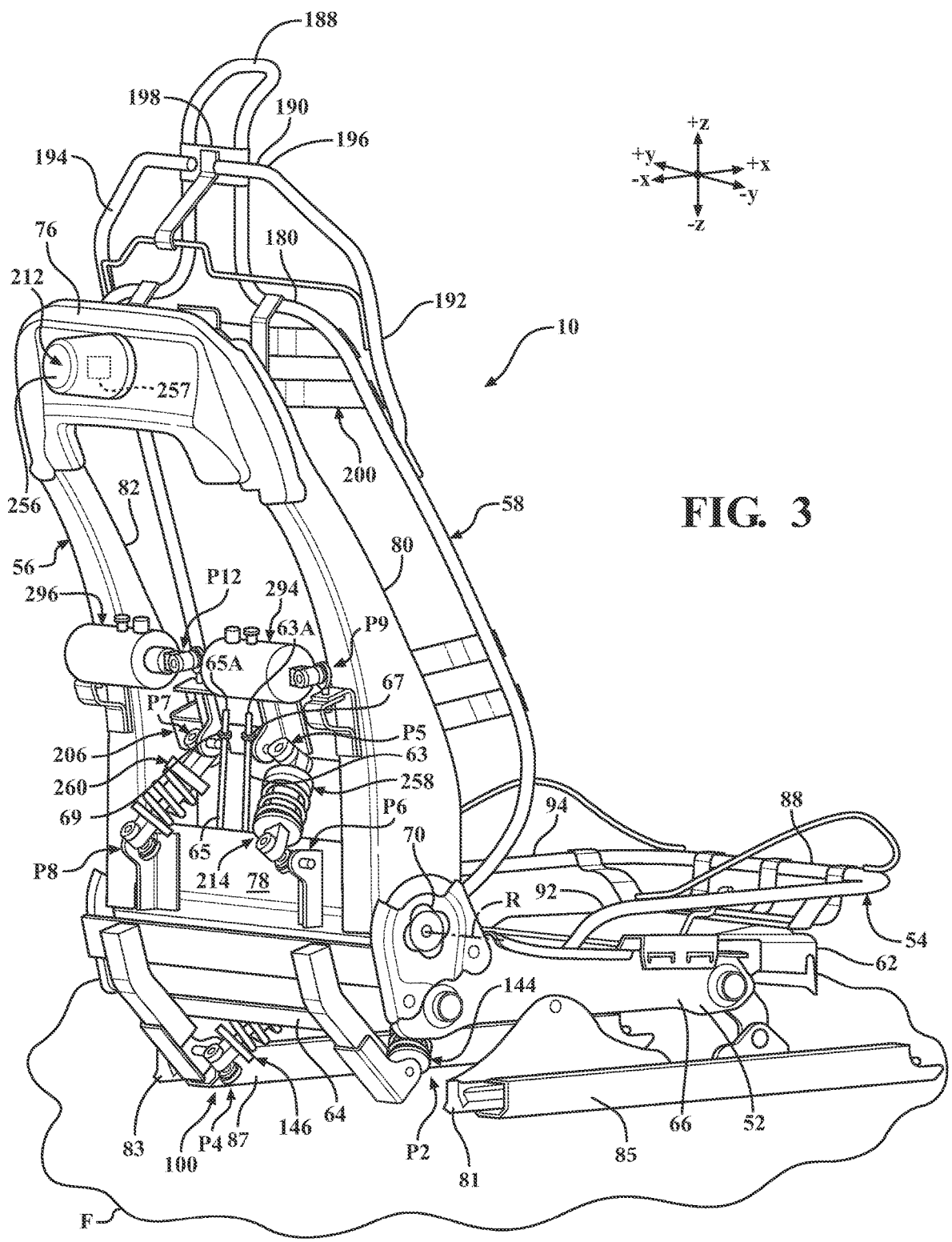
FIG. 3 schematically depicts a rear perspective view of the kinetic seat assembly of FIG. 1, according to one or more embodiments shown and described herein.
Figure 4:
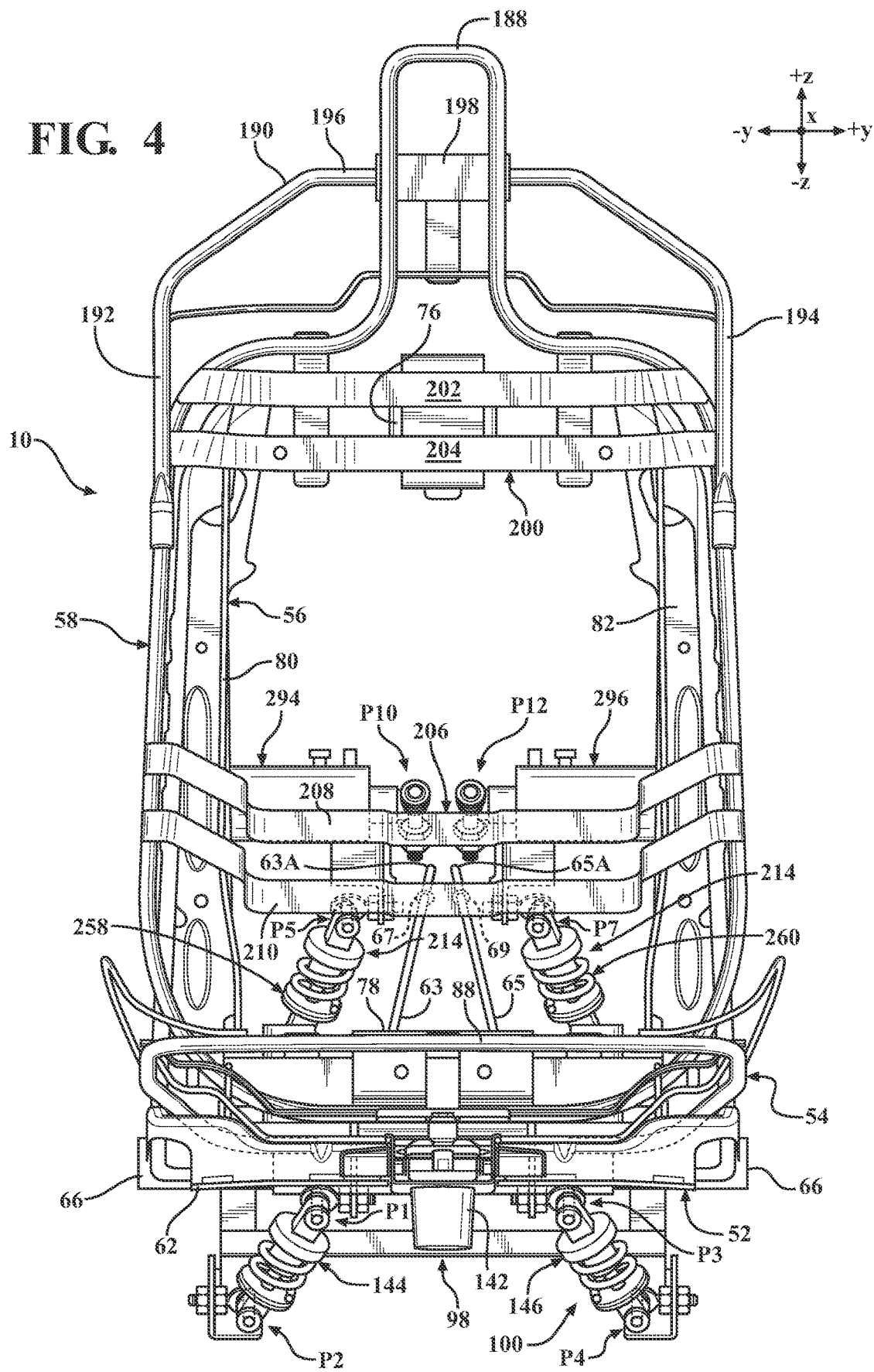
FIG. 4 schematically depicts a front view of the kinetic seat assembly of FIG. 1, according to one or more embodiments shown and described herein.

Referring to FIG. 3, the primary seat cushion frame 52 may also include a pair of recliner mechanisms 70 (only one is shown on side member 66) provided on opposite sides of the primary seat cushion frame 52, proximate the rear member 64. The primary seat cushion frame 52 may include a pair of rails 81, 83 for slidably engaging a pair of tracks 85, 87 mounted to a floor F of the passenger compartment 14 of the vehicle 12. Sliding the pair of rails 81, 83 along the tracks 85, 87 allows the occupant to move the kinetic seat assembly 10 forward or backward in the vehicle longitudinal direction in order to comfortably position the kinetic seat assembly 10 and the occupant with respect to a steering wheel 20 of the vehicle 12.

Referring now to FIGS. 2-5, the primary seat back frame 56 may have a generally rectangular shape. The primary seat back frame 56 includes an upper member 76 provided proximate an upper portion thereof and a lower member 78 provided proximate a lower portion thereof interconnected by a pair of opposing side members 80, 82. As shown in FIG. 2, the primary seat back frame 56 also includes a pair of openings 84, 86 formed in the side members 80, 82 of the primary seat back frame 56, proximate the lower member 78. The recliner mechanisms 70 in the primary seat cushion frame 52 engage the pair of openings 84, 86 formed in the primary seat back frame 56 in order to allow the primary seat back frame 56 to rotate about reclining axis R with respect to the primary seat cushion frame 52.

In other embodiments of the kinetic seat assembly 10, the pair of openings 84, 86 are instead formed in the primary seat cushion frame 52 and the pair of recliner mechanisms 70 are provided on the primary seat back frame 56. In some embodiments, both the primary seat cushion frame 52 and the primary seat back frame 56 have mating recliner mechanisms, such as corresponding female and male recliner mechanisms, that engage with one another to facilitate rotation of the primary seat back frame 56 about reclining axis R with respect to the primary seat cushion frame 52.

The secondary seat cushion frame 54 has a shape contoured to conform to the pelvis of the occupant to provide sufficient support when seated in the kinetic seat assembly 10. As such, the secondary seat cushion frame 54 includes a front bar 88 provided proximate a front portion thereof, a rear bar 90 provided proximate a rear portion thereof, and a pair of side bars 92, 94 interconnecting the front bar 88 and the rear bar 90. In some embodiments, the secondary seat cushion frame 54 may include at least one cross bar 96 interconnecting the pair of side bars 92, 94. The at least one cross bar 96 may be contoured to provide additional support to the occupant's pelvis. In some embodiments, the at least one cross bar 96 may interconnect the front bar 88 and the rear bar 90.

The secondary seat cushion frame 54 is suspended above the primary seat cushion frame 52 at a plurality of pivot points in order to facilitate pivoting and rotation of the secondary seat cushion frame 54 with respect to the primary seat cushion frame 52. These pivot points are positioned proximate opposite front and rear portions of the secondary seat cushion frame 54 to facilitate the greatest degree of rotation. Thus, the front bar 88 of the secondary seat cushion frame 54 is suspended above the front member 62 of the primary seat cushion frame 52 by a front pivot mechanism 98 and the rear bar 90 of the secondary seat cushion frame 54 is suspended above the rear member 64 of the primary seat cushion frame 52 by a seat cushion tilt mechanism 100.

Figure 6:
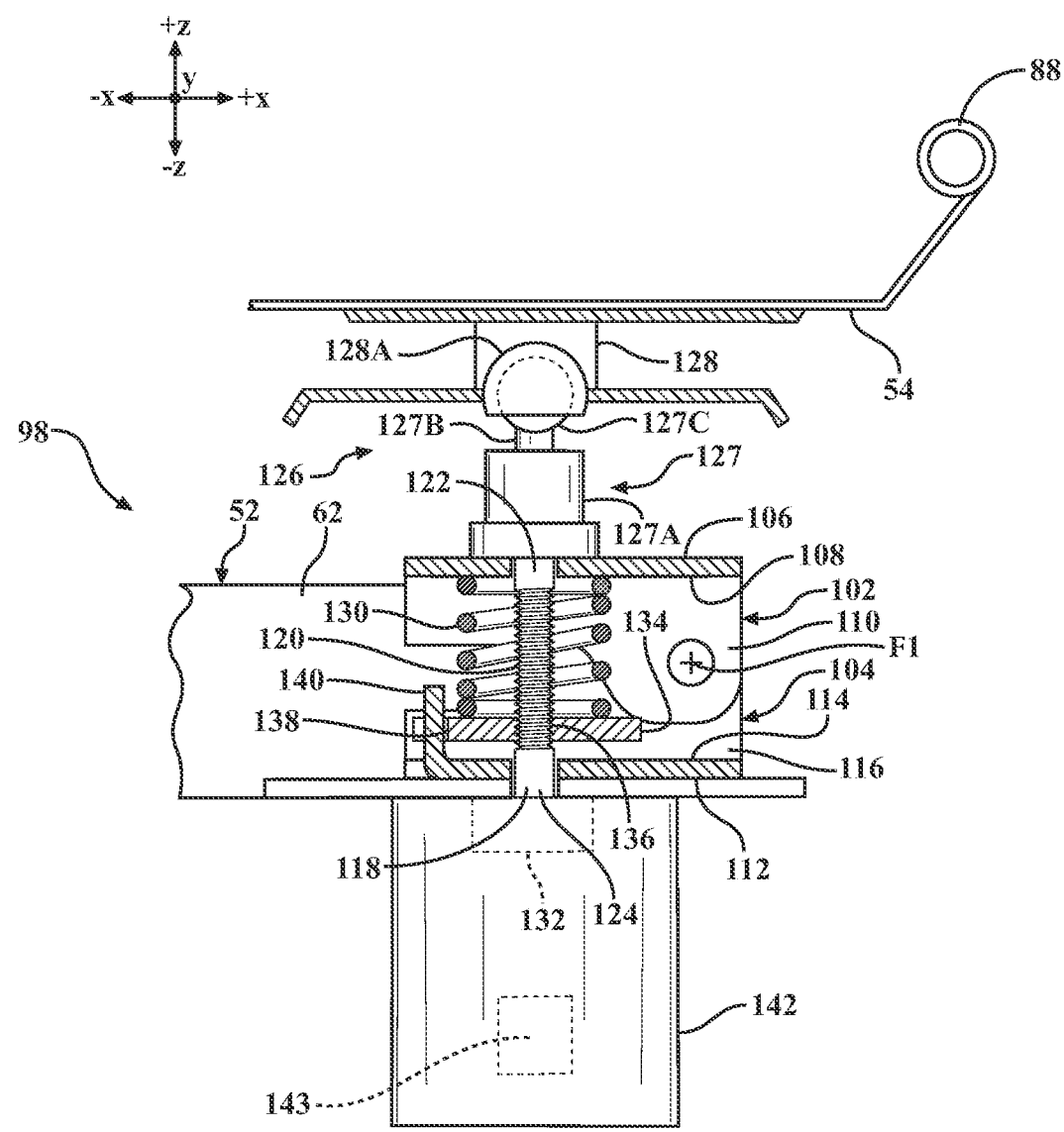
FIG. 6 schematically depicts a partial side view of a front pivot mechanism of the kinetic seat assembly of FIG. 1, according to one or more embodiments shown and described herein.

As noted above, the front pivot mechanism 98 is disposed between the primary seat cushion frame 52 and the secondary seat cushion frame 54 proximate front portions thereof in order to suspend the secondary seat cushion frame 54 above the primary seat cushion frame 52. As shown in FIG. 6, the front pivot mechanism 98 may be an adjustable damper and includes a pivotable arm 102 and a fixed arm 104. The pivotable arm 102 has an outer surface 106 and an opposite inner surface 108. At least one flange 110 extends perpendicular to the inner surface 108 of the pivotable arm 102 and inwardly toward the fixed arm 104. The fixed arm 104 also includes an outer surface 112 and an opposite inner surface 114. At least one flange 116 extends perpendicular to the inner surface 114 of the fixed arm 104 and inwardly toward the pivotable arm 102. The flange 110 of the pivotable arm 102 is pivotally connected to the flange 116 of the fixed arm 104 about a fixed axis F1 using any suitable fastener, such as a rivet, bolt, or the like, in order to permit the pivotable arm 102 to pivot about the fixed axis F1 with respect to the fixed arm 104.

The front pivot mechanism 98 includes a threaded shaft 118. The threaded shaft 118 includes external threads 120 along at least a portion thereof, a first end 122, and an opposite second end 124. The threaded shaft 118 extends through the pivotable arm 102 and the fixed arm 104 in order to couple the primary seat cushion frame 52 to the secondary seat cushion frame 54.

The front pivot mechanism 98 includes a ball joint 126 connecting the pivotable arm 102 to the secondary seat cushion frame 54. The ball joint 126 includes a ball member 127 and a coupling member 128 that are coupled together to form the ball joint 126. The ball member 127 includes a base 127A, an arm 127B, and a ball 127C. The base 127A extends outwardly from the outer surface 106 of the pivotable arm 102. The arm 127B extends outwardly from the base 127A. The ball 127C is positioned on a distal end of the arm 127B. The ball 127C has a generally spherical shape and has a diameter greater than a diameter of the arm 127B. The coupling member 128 is fixed to the secondary seat cushion frame 54 proximate the front bar 88. The coupling member 128 includes a socket 128A having a generally hollow spherical cavity that is configured to receive at least a portion of the ball 127C such that the ball member 127 is rotatably attached to the coupling member 128.

The second end 124 of the threaded shaft 118 extends through the fixed arm 104 and the front member 62 of the primary seat cushion frame 52. As such, the front pivot mechanism 98, particularly the connection of the ball joint 126 and the coupling member 128, permits the secondary seat cushion frame 54 to rotate about an X, a Y, and a Z-axis with respect to the primary seat cushion frame 52 in order to move the secondary seat cushion frame 54 in a roll, a pitch, and a yaw direction.

A biasing member 130, such as a spring, is disposed around the threaded shaft 118 between the inner surface 108 of the pivotable arm 102 and the inner surface 114 of the fixed arm 104 in order to damp pivoting between the pivotable arm 102 and the fixed arm 104. Thus, the front pivot mechanism 98 also provides a damping effect between the secondary seat cushion frame 54 and the primary seat cushion frame 52 in the vehicle vertical direction during operation.

In some embodiments, the front pivot mechanism 98 includes a rotatable member 132 fixedly secured to the second end 124 of the threaded shaft 118 such that rotation of the rotatable member 132 rotates the threaded shaft 118. As will be described in greater detail herein, the rotation of the rotatable member 132 increases or decreases a damping effect of the biasing member 130 by increasing or decreasing compression of the biasing member 130, respectively. When compression of the biasing member 130 is increased, a length of the biasing member 130 is reduced. Similarly, when compression of the biasing member 130 is decreased, the length of the biasing member 130 is increased. It should be appreciated that increasing or decreasing the length of the biasing member 130 respectively increases or decreases the amount of a damping effect exhibited on the secondary seat cushion frame 54.

As used herein, the term "damping effect" is referred a degree of compression of a biasing member, such as a spring, and the length of the biasing member. As such, a damping effect is directly correlated to an amount of travel between ends of the biasing member. Thus, when a biasing member is compressed and the length of travel between ends of the biasing member is decreased, a damping effect is also decreased. Alternatively, when a biasing member is extended and the length of travel between ends of the biasing member is increased, the damping effect is also increased.

The front pivot mechanism 98 may also include a traversing plate 134 having internal threads 136 that mate with the external threads 120 of the threaded shaft 118. The traversing plate 134 includes a planar contact surface 138. The traversing plate 134 may be any suitable geometry, but, in any event, includes the planar contact surface 138. Thus, the traversing plate 134 may have a semi-circular or square geometry. An anti-rotation plate 140 extends outwardly from the fixed arm 104 perpendicular to the traversing plate 134.

As the rotatable member 132 is rotated, such as manually by hand or using a tool or automatically by an actuator 143, the anti-rotation plate 140 prevents the traversing plate 134 from rotating with the rotation of the threaded shaft 118 due to the rotation of the rotatable member 132 as the planar contact surface 138 contacts the anti-rotation plate 140. As a result, the traversing plate 134 is linearly displaced upwardly or downwardly in the vehicle vertical direction onto the threaded shaft 118 based on the direction in which the rotatable member 132 is rotated, thereby increasing or decreasing the compression of the biasing member 130. When the rotatable member 132 is rotated in a first direction, the threaded shaft 118 is also rotated in the first direction, which linearly displaces the traversing plate 134 toward the first end 122 of the threaded shaft 118 due to the contact between the contact surface 138 of the traversing plate 134 and the anti-rotation plate 140. Moving the traversing plate 134 toward the first end 122 of the threaded shaft 118 decreases the damping effect of the biasing member 130 by decreasing the length of the biasing member 130 and increasing compression of the biasing member 130. When the rotatable member 132 is rotated in an opposite second direction, the threaded shaft 118 is also rotated in the second direction, which linearly displaces the traversing plate 134 away from the first end 122 of the threaded shaft 118 due to the contact between the contact surface 138 of the traversing plate 134 and the anti-rotation plate 140. Moving the traversing plate 134 away from the first end 122 of the threaded shaft 118 increases the damping effect of the biasing member 130 by increasing the length of the biasing member 130 and decreasing compression of the biasing member 130. In some embodiments, a handle 142 is secured to the rotatable member 132 to facilitate manual rotation by hand of the front pivot mechanism 98 by the occupant without the use of any additional tools. In other embodiments, as noted above, an actuator 143 may be provided and configured to rotate the rotatable member 132 and, thus, the threaded shaft 118 in the first direction and the second direction. The actuator 143 may be connected to the electronic control unit 32 and controllable by the user through the user interface 24.

As noted above, the secondary seat cushion frame 54 is suspended above the primary seat cushion frame 52 by the front pivot mechanism 98 as well as the seat cushion tilt mechanism 100. In some embodiments, the seat cushion tilt mechanism 100 includes first and second pivotable seat cushion dampers 144, 146 interconnecting the primary seat cushion frame 52 and the secondary seat cushion frame 54. The seat cushion dampers 144, 146 extend inwardly from the rear member 64 of the primary seat cushion frame 52 to the rear bar 90 of the secondary seat cushion frame 54.

As shown in FIGS. 12-15, discussed in more detail below, the first seat cushion damper 144 rotates with respect to the rear portion of the secondary seat cushion frame 54, particularly the rear bar 90, at pivot P1 and with respect to the rear portion of the primary seat cushion frame 52, particularly the rear member 64, at pivot P2. The second seat cushion damper 146 rotates with respect to the rear portion of the secondary seat cushion frame, particularly the rear bar 90, at pivot P3 and with respect to the rear portion of the primary seat cushion frame 52, particularly the rear member 64, at pivot P4. It should also be understood that any movement exhibited on one of the seat cushion dampers 144, 146 results in a corresponding movement on the other seat cushion damper. The position of the seat cushion dampers 144, 146 and the secondary seat cushion frame 54 are indicated as solid lines in their initial at rest position prior to any movement and as dashed lines after a turning operation of the vehicle 12 has been performed.

Figure 7:
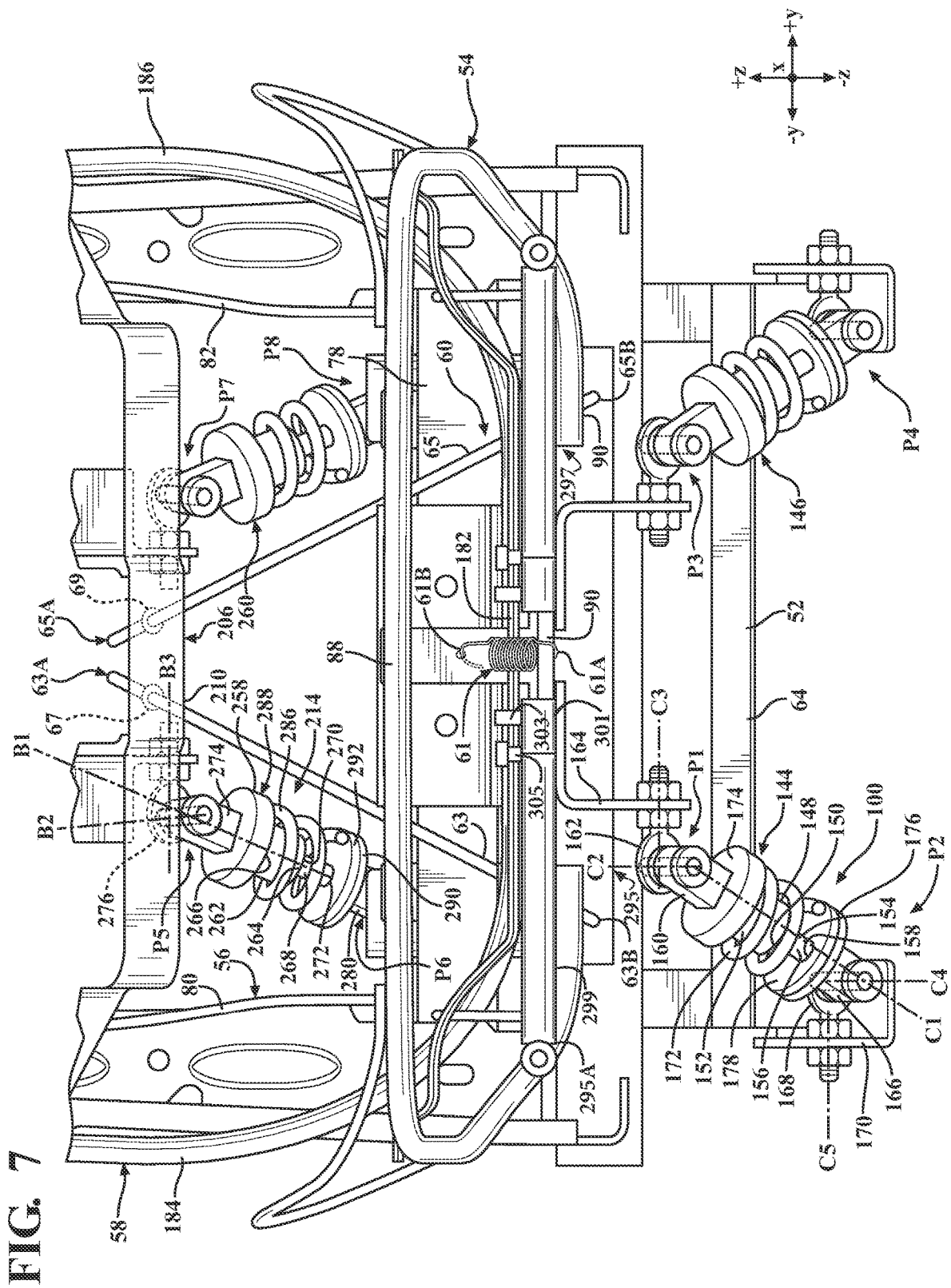
FIG. 7 schematically depicts a partial front perspective view of the kinetic seat assembly of FIG. 1, according to one or more embodiments shown and described herein.

It is to be understood that each seat cushion damper 144, 146, is identical in structure and, thus, only the first seat cushion damper 144 will be described in detail and with reference to FIG. 7. In some embodiments, the seat cushion damper 144 includes an outer tube 148 and an inner tube 154. The outer tube 148 includes a first end 150 and an opposite second end 152. The inner tube 154 includes a first end 156 and an opposite second end 158. In some embodiments, the inner tube 154 and the outer tube 148 are permitted to rotate with respect to one another about an axis C1. Additionally, the inner tube 154 may extend and retract from the outer tube 148, but the inner tube 154 may be restricted from retracting completely out of the outer tube 148. The second end 152 of the outer tube 148 is fixed to a first extension 160. The first extension 160 is rotatably connected to a first eye bolt 162 and rotates about an axis C2. The first eye bolt 162 may be fixed to a bracket 164 fixed to the rear bar 90 of the secondary seat cushion frame 54. In some embodiments, the first eye bolt 162 may be rotatably connected to the bracket 164 about an axis C3. The second end 158 of the inner tube 154 is fixed to a second extension 166. The second extension 166 is rotatably connected to a second eye bolt 168 and rotates about an axis C4. The second eye bolt 168 may be fixed to a bracket 170 fixed to the rear member 64 of the primary seat cushion frame 52. In some embodiments, the second eye bolt 168 may be rotatably connected to the bracket 170 about an axis C5, which stays parallel to the Y-axis. It is appreciated that the first eye bolt 162 and the second eye bolt 168 may be brackets having a joint such as a heim joint or ball joint.

In some embodiments, as discussed in more detail below, the inner tube 154 slidably moves in and out of the first end 150 of the outer tube 148 in order to adjust the length of the seat cushion damper 144 based on the movement of the secondary seat cushion frame 54 with respect to the primary seat cushion frame 52. In some embodiments, although not shown, the seat cushion damper 144 also includes a ball joint at one or both ends of the seat cushion damper 144 to provide necessary rotation of the seat cushion damper 144 with respect to the primary seat cushion frame 52 and/or the secondary seat cushion frame 54.

In some embodiments, the seat cushion damper 144 includes a biasing member 172, such as a spring, for providing a damping effect between the first extension 160 and the second extension 166. More particularly, the biasing member 173 provides a damping effect between the outer tube 148 and the inner tube 154. Thus, an upper disc 174 is provided at the second end 152 of the outer tube 148 and a lower disc 176 is provided at the second end 158 of the inner tube 154. The first extension 160 is coupled to the upper disc 174 and the second extension 166 is coupled to the lower disc 176. The biasing member 172 is disposed between the upper disc 174 and the lower disc 176 and around the inner tube 154 and the outer tube 148. As a result, a damping effect between the inner tube 154 and the outer tube 148 is provided.

In other embodiments, the damping effect between the inner tube 154 and the outer tube 148 is manually adjustable. In such an embodiment, the inner tube 154 is externally threaded and a rotatable member 178 having a diameter larger than that of the biasing member 172 is threadedly provided on the inner tube 154 between the biasing member 172 and the lower disc 176. Thus, as the rotatable member 178 is screwed onto the inner tube 154 toward the outer tube 148, the compression of the biasing member 172 is increased, thereby decreasing the length of the biasing member 172 and decreasing the degree of the damping effect between the primary seat cushion frame 52 and the secondary seat cushion frame 54.

It is to be understood that variations of the seat cushion damper 144 may be contemplated and within the scope of the present disclosure. For example, in some embodiments, it is to be appreciated that the orientation of the outer tube 148 and the inner tube 154 may switched such that the outer tube 148 is coupled to the primary seat cushion frame 52 and the inner tube 154 is coupled to the secondary seat cushion frame 54. In addition, the outer tube 148 may be threaded, as opposed to the inner tube 154, and the rotatable member 178 may alternatively be provided on the outer tube 148 in order to increase compression of the biasing member 172.

Referring again to FIGS. 2-5 and with respect now to the secondary seat back frame 58, the secondary seat back frame 58 has a shape contoured to conform to the torso of the occupant to provide sufficient support. As such, the secondary seat back frame 58 includes an upper bar 180 provided proximate an upper portion thereof, a lower bar 182 provided proximate a lower portion thereof, and a pair of side bars 184, 186 interconnecting the upper bar 180 and the lower bar 182. The upper bar 180 may include a head rest frame 188 integrally formed with and extending upwardly from the upper bar 180 in order to provide additional support to the head and neck of the occupant. In some embodiments, a head support frame 190 is provided and extends upwardly from the side bars 184, 186 of the secondary seat back frame 58. The head support frame 190 is a generally inverted U-shaped member including a pair of arms 192, 194 connected to the side bars 184, 186 of the secondary seat back frame 58. The head support frame 190 also includes a medial portion 196 interconnecting the arms 192, 194 of the head support frame 190. The head support frame 190 is secured to a bracket 198 on the rear of the head rest frame 188 in order to provide additional support to the head rest frame 188 and, thus, the head and neck of the occupant to avoid possible whiplash during a collision or abrupt acceleration.

The secondary seat back frame 58 also includes an upper brace 200 interconnecting the side bars 184, 186 thereof. The upper brace 200 is contoured inwardly toward the rear of the kinetic seat assembly 10 in order to further conform to an upper portion of the torso of the occupant. The upper brace 200 may include a pair of cross members 202, 204. However, it is understood that only a single longitudinal strip may be used. As discussed in more detail below, the upper brace 200 is utilized to secure the secondary seat back frame 58 to an upper pivot mechanism 212.

The secondary seat back frame 58 also includes a lower brace 206 interconnecting the side bars 184, 186 thereof. The lower brace 206 is contoured inwardly toward the rear of the kinetic seat assembly 10, similar to the upper brace 200, in order to further conform to a lower portion of the torso of the occupant. The lower brace 206 may include a pair of cross members 208, 210. However, it is understood that only a single longitudinal strip may be used. As discussed in more detail below, the lower brace 206 is utilized to secure the secondary seat back frame 58 to the seat back tilt mechanism 214.

The secondary seat back frame 58 is suspended in front of the primary seat back frame 56 at a plurality of pivot points in order to facilitate pivoting and rotation of the secondary seat back frame 58 with respect to the primary seat back frame 56. These pivot points are positioned proximate opposite upper and lower portions of the secondary seat back frame 58 to facilitate the greatest degree of rotation. Thus, the upper bar 180 of the secondary seat back frame 58 is suspended in front of the upper member 76 of the primary seat back frame 56 by the upper pivot mechanism 212 and the lower brace 206 of the secondary seat back frame 58 is suspended in front of the primary seat back frame 56 by the seat back tilt mechanism 214.

As noted above, and shown in FIGS. 2 and 7, the secondary seat cushion frame 54 and the secondary seat back frame 58 are connected to one another at a rear portion and a lower portion, respectively, by a linkage member 60. In one embodiment, the linkage member 60 is a biasing member 61, such as spring, to provide additional damping during movement of the kinetic seat assembly 10 or, alternatively, a rigid connector. As shown, the biasing member 61 includes a first hook 61A engaging the rear bar 90 of the secondary seat cushion frame 54 and a second hook 61B engaging the lower bar 182 of the secondary seat back frame 58. As discussed in more detail below, this ensures that the secondary seat cushion frame 54 and the secondary seat back frame 58 move in phase, i.e., in unison and in the same direction, with one another.

Figure 5:
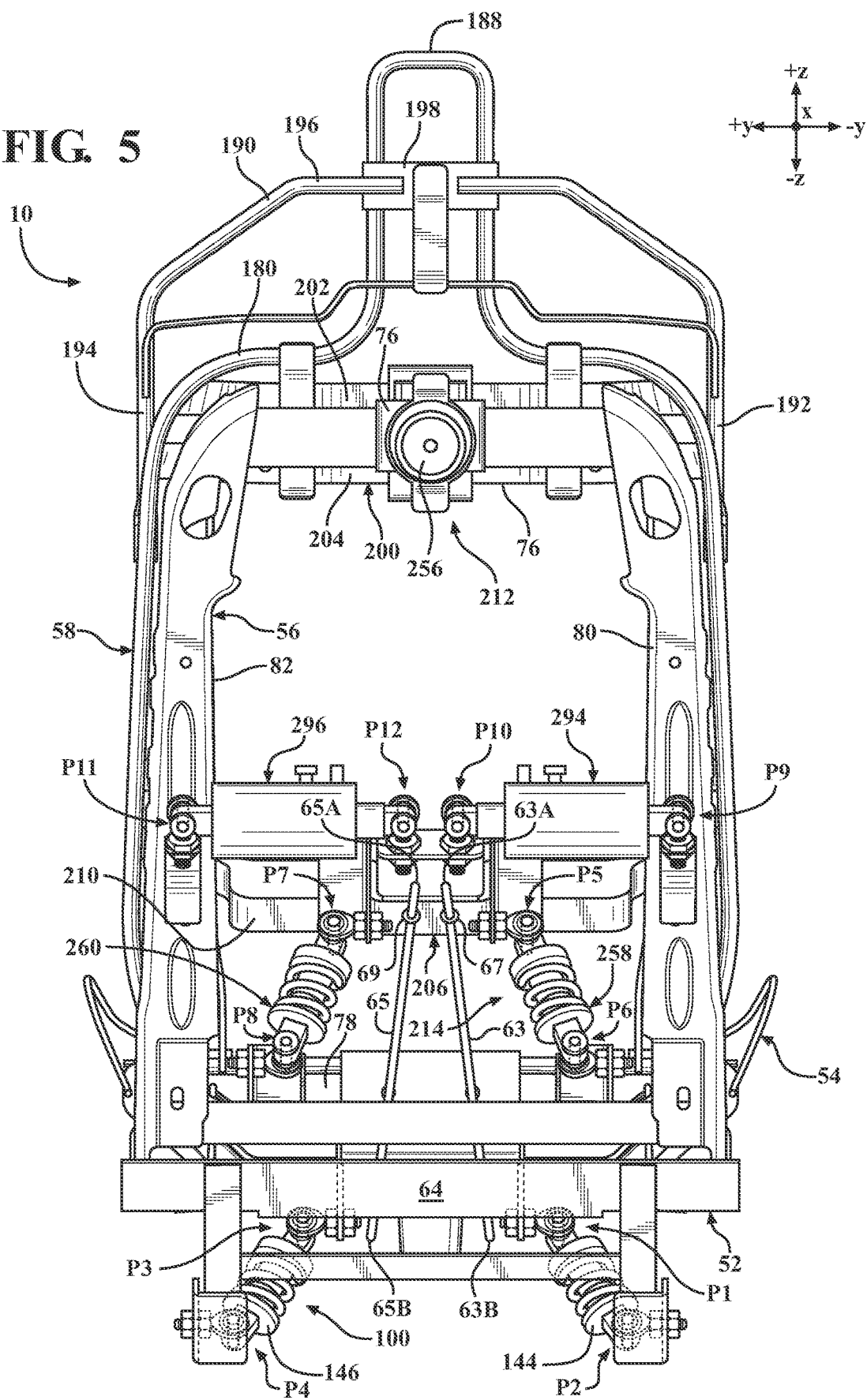
FIG. 5 schematically depicts a rear view of the kinetic seat assembly of FIG. 1, according to one or more embodiments shown and described herein.
Figure 9:
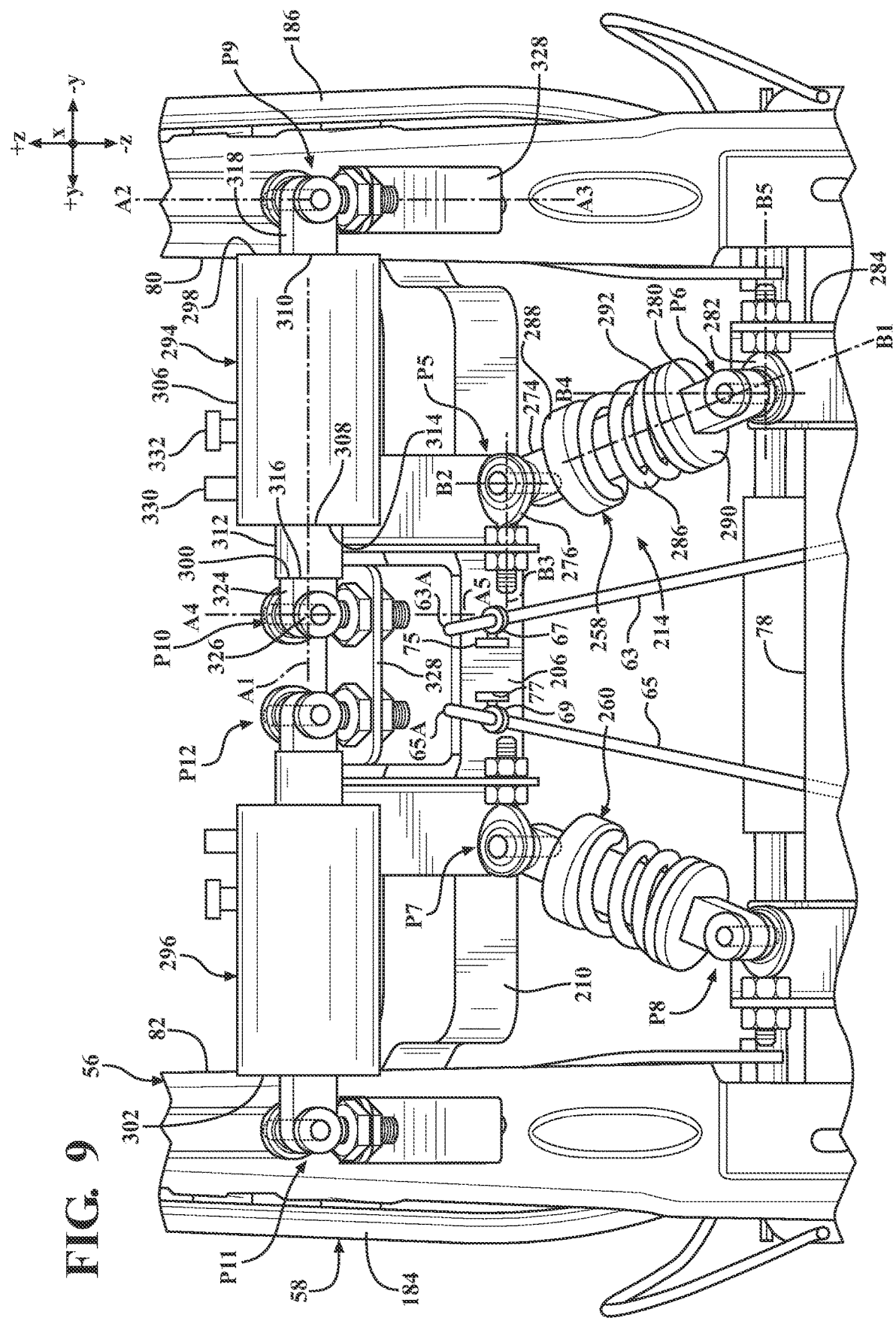
FIG. 9 schematically depicts a partial rear view of the kinetic seat assembly of FIG. 1, according to one or more embodiments shown and described herein.

In another embodiment, as shown in FIGS. 2, 5, and 9, the linkage member 60 is a pair of struts 63, 65 interconnecting the secondary seat cushion frame 54 and the secondary seat back frame 58. Although a pair of struts 63, 65 are shown, it should be appreciated that only a single strut may be utilized to ensure that the secondary seat cushion frame 54 and the secondary seat back frame 58 move in phase with one another.

The first strut 63 includes a first end 63A and an opposite second end 63B. The first strut 63 is pivotally attached to the lower brace 206 of the secondary seat back frame 58 by a first joint 67. The first joint 67 may be a heim joint, ball joint, or the like. The first strut 63 may be fixed within the first joint 67 proximate the first end 63A thereof in order to prevent sliding of the first strut 63 out of engagement with the first joint 67. The first joint 67 may be attached directly to the lower brace 206 or a plate 75 may be provided to couple the first joint 67 to the lower brace 206. The first strut 63 is also pivotally attached to the rear bar 90 of the secondary seat cushion frame 54 by a second joint 71. The second joint 71 may be a heim joint, ball joint, or the like. The first strut 63 may be fixed within the second joint 71 proximate the second end 63B thereof in order to prevent sliding of the first strut 63 out of engagement with the second joint 67. The second joint 71 may be attached directly to the rear bar 90 or a plate may be provided to couple the second joint 71 to the rear bar 90.

Similarly, the second strut 65 includes a first end 65A and an opposite second end 65B. A pair of joints 69, 73, similar to the joints 67, 71 on the first strut 63, are provided to pivotally attach the second strut 65 to the lower brace 206 of the secondary seat back frame 58 and the rear bar 90 of the secondary seat cushion frame 54, respectively. The first and second joints 69, 73 may be attached directly to the lower brace 206 and the rear bar 90 or a plate may be provided to couple the joints 69, 73 thereto.

Figure 8:
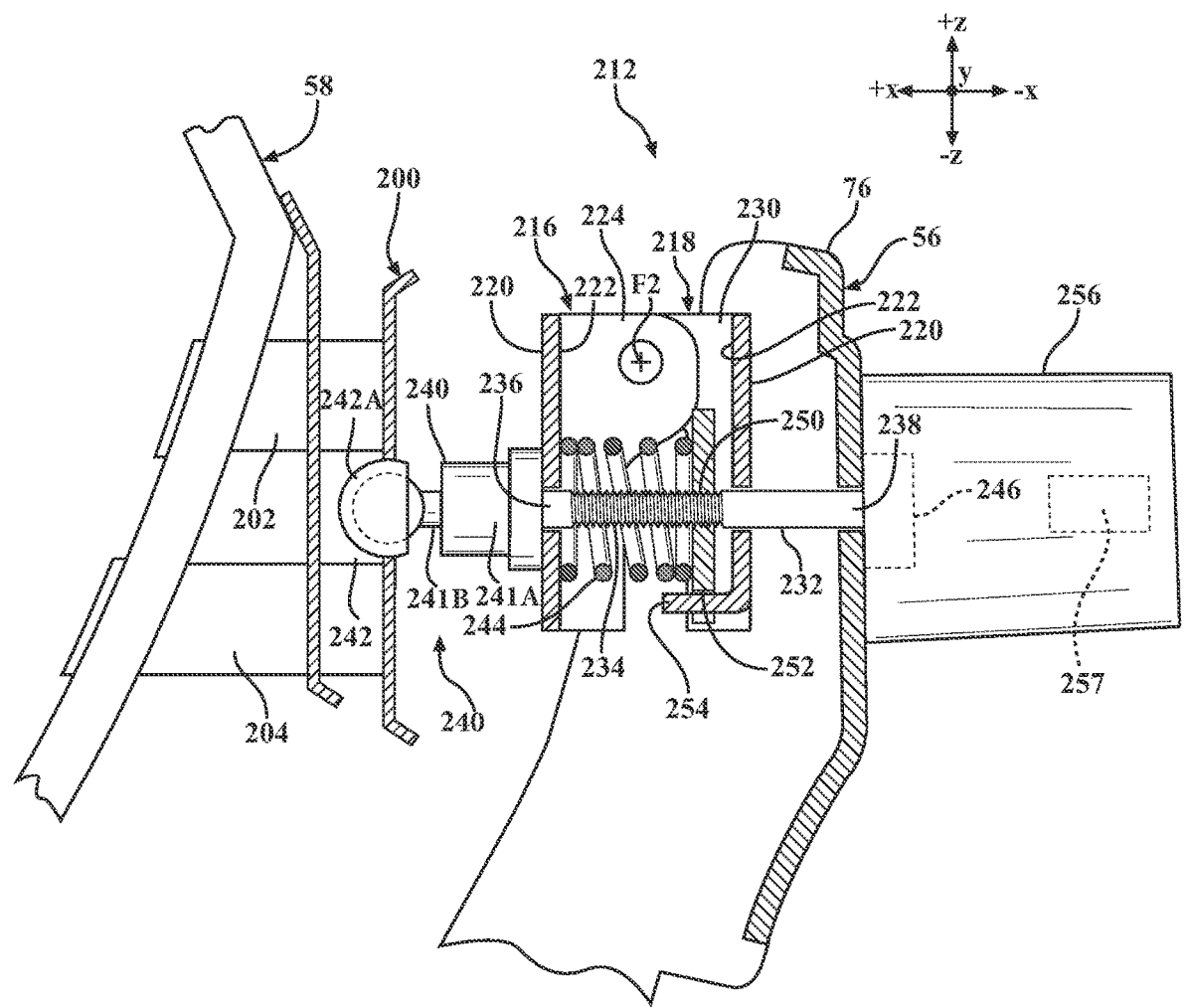
FIG. 8 schematically depicts a partial side view of an upper pivot mechanism of the kinetic seat assembly of FIG. 1, according to one or more embodiments shown and described herein.

As shown in FIG. 8, with more particularity, the upper pivot mechanism 212 is disposed between the primary seat back frame 56 and the secondary seat back frame 58 proximate upper portions thereof in order to suspend the secondary seat back frame 58 in front of the primary seat back frame 56. The upper pivot mechanism 212 may be an adjustable damper and includes a pivotable arm 216 and a fixed arm 218. The pivotable arm 216 has an outer surface 220 and an opposite inner surface 222. At least one flange 224 extends perpendicular to the inner surface 222 of the pivotable arm 216 and inwardly toward the fixed arm 218. The fixed arm 218 also includes an outer surface 220 and an opposite inner surface 222. At least one flange 230 extends perpendicular to the inner surface 222 of the fixed arm 218 and inwardly toward the pivotable arm 216. The flange 224 of the pivotable arm 216 is pivotally connected to the flange 230 of the fixed arm 218 about a fixed axis F2 using any suitable fastener, such as a rivet, bolt, or the like, in order to permit the pivotable arm 216 to pivot about the fixed axis F2 with respect to the fixed arm 218.

The upper pivot mechanism 212 includes a threaded shaft 232. The threaded shaft 232 includes external threads 234 along at least a portion thereof, a first end 236, and an opposite second end 238. The threaded shaft 232 extends through the pivotable arm 216 and the fixed arm 218 in order to couple the primary seat back frame 56 to the secondary seat back frame 58.

The upper pivot mechanism 212 includes a ball joint 240 connecting the pivotable arm 216 to the secondary seat back frame 58. The ball joint 240 includes a ball member 241 and a coupling member 242 that are coupled together to form the ball joint 240. The ball member 241 includes a base 241A, an arm 241B, and a ball 241C. The base 241A extends outwardly from the outer surface 220 of the pivotable arm 216. The arm 241B extends outwardly from the base 241A. The ball 241C is positioned on a distal end of the arm 241B. The ball 241C has a generally spherical shape and has a diameter greater than a diameter of the arm 241B. The coupling member 242 is fixed to the secondary seat back frame 58 proximate the upper brace 200. As shown, the coupling member 242 extends between the pair of cross members 202, 204 of the upper brace 200 and is fixed thereto. Alternatively, as noted above, the upper brace 200 may include only a single longitudinal strip and the coupling member 242 may be fixed directly thereto. The coupling member 242 includes a socket 242A having a generally hollow spherical cavity that is configured to receive at least a portion of the ball 241C such that the ball member 241 is rotatably attached to the coupling member 242.

The second end 238 of the threaded shaft 232 extends through the fixed arm 218 and the upper member 76 of the primary seat back frame 56. As such, the upper pivot mechanism 212, particularly the connection of the ball joint 240 and the coupling member 242, permits the secondary seat back frame 58 to rotate about an X, a Y, and a Z-axis with respect to the primary seat back frame 56 in order to move the secondary seat back frame 58 in a roll, a pitch, and a yaw direction.

A biasing member 244, such as a spring, is disposed around the threaded shaft 232 between the inner surface 222 of the pivotable arm 216 and the inner surface 222 of the fixed arm 218 in order to damp pivoting between the pivotable arm 216 and the fixed arm 218. Thus, the upper pivot mechanism 212 also provides a damping effect between the secondary seat back frame 58 and the primary seat back frame 56 in the vehicle longitudinal direction during operation.

In some embodiments, the upper pivot mechanism 212 includes a rotatable member 246 fixedly secured to the second end 238 of the threaded shaft 232 such that rotation of the rotatable member 246 rotates the threaded shaft 232. As will be described in greater detail herein, the rotation of the rotatable member 246 increases or decreases a damping effect of the biasing member 244 by increasing or decreasing compression of the biasing member 244, respectively. When compression of the biasing member 244 is increased, a length of the biasing member 244 is reduced. Similarly, when compression of the biasing member 244 is decreased, the length of the biasing member 244 is increased. It should be appreciated that increasing or decreasing the length of the biasing member 244 respectively increases or decreases the amount of a damping effect exhibited on the secondary seat back frame 58.

The upper pivot mechanism 212 may also include a traversing plate 248 having internal threads 250 that mate with external threads 234 of the threaded shaft 232. The traversing plate 248 includes a planar contact surface 252. The traversing plate 248 may be any suitable geometry, but, in any event, includes a planar contact surface 252. Thus, the traversing plate 248 may have a semi-circular or square geometry. An anti-rotation plate 254 extends outwardly from the fixed arm 218 perpendicular to the traversing plate 248.

As the rotatable member 246 is rotated, such as manually by hand or using a tool or automatically by an actuator 257, the anti-rotation plate 254 prevents the traversing plate 248 from rotating with the rotation of the threaded shaft 232 due to the rotation of the rotatable member 246 as the planar contact surface 252 of the traversing plate 248 contacts the anti-rotation plate 254. As a result, the traversing plate 248 is linearly displaced forward or rearward in the vehicle longitudinal direction onto the threaded shaft 232 based on the direction in which the rotatable member 246 is rotated, thereby increasing or decreasing the compression of the biasing member 244. When the rotatable member 246 is rotated in a first direction, the threaded shaft 232 is also rotated in the first direction, which linearly displaces the traversing plate 248 toward the first end 236 of the threaded shaft 232 due to the contact between the contact surface 252 and the anti-rotation plate 254. Moving the traversing plate 248 toward the first end 236 of the threaded shaft 232 decreases the damping effect of the biasing member 244 by decreasing the length of the biasing member 244 and increasing compression of the biasing member 244. When the rotatable member 246 is rotated in an opposite second direction, the threaded shaft 232 is also rotated in the second direction, which linearly displaces the traversing plate 248 away from the first end 236 of the threaded shaft 232 due to the contact between the contact surface 252 of the traversing plate 248 and the anti-rotation plate 254. Moving the traversing plate 248 away from the first end 236 of the threaded shaft 232 increases the damping effect of the biasing member 244 by increasing the length of the biasing member 244 and decreasing compression of the biasing member 244. In some embodiments, a handle 256 is secured to the rotatable member 246 to facilitate rotation by hand of the upper pivot mechanism 212 by the occupant without the use of any additional tools. In other embodiments, as noted above, an actuator 257 may be provided and configured to rotate the rotatable member 246 and, thus, the threaded shaft 232 in the first direction and the second direction. The actuator 257 may be connected to the electronic control unit 32 and controllable by the user through the user interface 24.

As noted above, the secondary seat back frame 58 is suspended in front of the primary seat back frame 56 by the upper pivot mechanism 212 and the seat back tilt mechanism 214. In some embodiments, the seat back tilt mechanism 214 includes first and second pivotable seat back dampers 258, 260 interconnecting the primary seat back frame 56 and the secondary seat back frame 58. The seat back dampers 258, 260 extend inwardly from the lower member 78 of the primary seat back frame 56 to the lower brace 206 of the secondary seat back frame 58.

As shown in FIGS. 12-15, discussed in more detail below, the first seat back damper 258 rotates with respect to the lower portion of the secondary seat back frame 58, particularly the lower brace 206, at pivot P5 and with respect to the lower portion of the primary seat back frame 56, particularly the lower member 78, at pivot P6. The second seat back damper 260 rotates with respect to the lower portion of the secondary seat back frame 58, particularly the lower brace 206, at pivot P7 and with respect to the lower portion of the primary seat back frame 56, particularly the lower member 78, at pivot P8. It should also be understood that any movement exhibited on one of the seat back dampers 258, 260 results in a corresponding movement on the other seat back damper 258, 260. The position of the seat back dampers 258, 260 and the secondary seat back frame 58 are indicated as solid lines in their initial at rest position prior to any movement and as dashed lines after a turning operation of the vehicle 12 has been performed.

It is to be understood that each seat back damper 258, 260 is identical in structure and, thus, only one seat back damper 258 will be described in detail and with reference to FIGS. 7 and 9. In some embodiments, the seat back damper 258 includes an outer tube 262 and an inner tube 268. The inner tube 268 includes a first end 270 and an opposite second end 272. In some embodiments, the inner tube 268 and the outer tube 262 are permitted to rotate with respect to one another about an axis B1. Additionally, the inner tube 268 may extend and retract from the outer tube 262, but the inner tube 268 may be restricted from retracting completely out of the outer tube 262. The second end 266 of the outer tube 262 is fixed to a first extension 274. The first extension 274 is rotatably connected to a first eye bolt 276 and rotates about an axis B2. The first eye bolt 276 may be fixed to a bracket 278 fixed to the lower brace 206 of the secondary seat back frame 58. In some embodiments, the first eye bolt 276 may be rotatably connected to the lower brace 206 about an axis B3. The second end 272 of the inner tube 268 is fixed to a second extension 280. The second extension 280 is rotatably connected to a second eye bolt 282 and rotates about an axis B4. The second eye bolt 282 may be fixed to a bracket 284 fixed to the lower member 78 of the primary seat cushion frame 52. In some embodiments, the second eye bolt 282 may be rotatably connected to the bracket 284 about an axis B5, which stays parallel to the X-axis. It is appreciated that the first eye bolt 276 and the second eye bolt 282 may be brackets having a joint such as a heim joint or ball joint.

In use, in some embodiments, as discussed in more detail below, the inner tube 268 slidably moves in and out of the first end 264 of the outer tube 262 in order to adjust the length of the seat back damper 258 based on the movement of the secondary seat back frame 58 with respect to the primary seat back frame 56. In some embodiments, although not shown, the seat back damper 258 includes a ball joint at one or both ends of the seat back damper 258 to provide necessary rotation of the seat back damper 258 with respect to the primary seat back frame 56 and/or the secondary seat back frame 58.

In some embodiments, the seat back damper 258 includes a biasing member 286, such as a spring, for providing a damping effect between the first extension 274 and the second extension 280. More particularly, the biasing member 286 provides a damping effect between the outer tube 262 and the inner tube 268. Thus, an upper disc 288 is provided at the second end 266 of the outer tube 262 and a lower disc 290 is provided at the second end 272 of the inner tube 268. The first extension 274 is coupled to the upper disc 288 and the second extension 280 is coupled to the lower disc 290. The biasing member 286 is disposed between the upper disc 288 and the lower disc 290 and around the inner tube 268 and the outer tube 262. As a result, a damping effect between the inner tube 268 and the outer tube 262 is provided.

In other embodiments, the amount of damping between the inner tube 268 and the outer tube 262 is manually adjustable. In such an embodiment, the inner tube 268 is externally threaded and a rotatable member 292 having a diameter larger than that of the biasing member 286 is threadedly provided on the inner tube 268 between the biasing member 286 and the lower disc 290. Thus, as the rotatable member 292 is screwed onto the inner tube 268 toward the outer tube 262, the compression of the biasing member 286 is increased, thereby decreasing the degree of a damping effect between the primary seat back frame 56 and the secondary seat back frame 58.

It is to be understood that variations of the seat back damper 258 are contemplated and within the scope of the present disclosure. For example, in some embodiments, it is to be appreciated that the orientation of the outer tube 262 and the inner tube 268 may switched such that the outer tube 262 is coupled to the primary seat back frame 56 and the inner tube 268 is coupled to the secondary seat back frame 58. In addition, the outer tube 262 may be threaded, as opposed to the inner tube 268, and the rotatable member 292 may alternatively be provided on the outer tube 262 as well in order to increase compression of the biasing member 286.

In some embodiments, at least one supplemental damper is utilized in order to further damp the movement of the secondary seat back frame 58 with respect to the primary seat back frame 56. As shown in FIGS. 9 and 12-15, a pair of supplemental dampers 294, 296 are utilized and disposed on opposite sides of the secondary seat back frame 58. In embodiments utilizing a first supplemental damper 294 and a second supplemental damper 296 in order to damp movement of the secondary seat back frame 58, each supplemental damper 294, 296 is attached at opposite ends thereof to respective side members 80, 82 of the primary seat back frame 56 and the lower brace 206 of the secondary seat back frame 58. More particularly, a first end 298 of the first supplemental damper 294 is pivotally attached to the side member 80 of the primary seat back frame 56 at pivot P9 and an opposite second end 300 of the first supplemental damper 294 is pivotally attached to the lower brace 206 of the secondary seat back frame 58 at pivot P10. Similarly, a first end 302 of the second supplemental damper 296 is pivotally attached to the opposite side member 82 of the primary seat back frame 56 at pivot P11 and an opposite second end 304 of the second supplemental damper 296 is pivotally attached to the lower brace 206 of the secondary seat back frame 58 at pivot P12. In FIGS. 12-16, the position of the supplemental dampers 294, 296 and the lower brace 206 are indicated as solid lines in their initial at rest position prior to any movement and as dashed lines after a turning operation of the vehicle 12 has been performed.

It is to be understood that each supplemental damper 294, 296 is identical in structure and, thus, only one supplemental damper 294 will be described in detail. As shown in FIG. 9, the supplemental damper 294 includes an outer tube 306 having a first end 308 and an opposite second end 310 and an inner tube 312 having a first end 314 and an opposite second end 316. The inner tube 312 and the outer tube 306 are permitted to rotate with respect to one another about an axis A1. Additionally, the inner tube 312 may extend and retract from the outer tube 306, but the inner tube 312 is restricted from retracting completely out of the outer tube 306. The second end 310 of the outer tube 306 is fixed to a first extension 318. The first extension 318 is rotatably connected to a first eye bolt 320 and rotates about an axis A2. The first eye bolt 320 is rotatably connected to a bracket 328 fixed to a side member 80 of the primary seat back frame 56. Thus, the first eye bolt 320 is rotatable about an axis A3. The second end 316 of the inner tube 312 is fixed to a second extension 324. The second extension 324 is rotatably connected to a second eye bolt 326 and rotates about an axis A4. The second eye bolt 326 is rotatably connected to a bracket 328 fixed to the lower brace 206 of the secondary seat back frame 58. Thus, the second eye bolt 326 is rotatable about an axis A5. In use, the supplemental damper 294 operates to permit the inner tube 312 to slidably move in and out of the first end 308 of the outer tube 306 in order to further damp the movement of the secondary seat back frame 58 with respect to the primary seat back frame 56.

In some embodiments, the supplemental damper 294 is a pneumatic actuator. As such, the pneumatic supplemental damper 294 includes an inlet 330 for connecting to an air supply. Air is supplied into the pneumatic supplemental damper 294, particularly the outer tube 306, to a predetermined amount to control the degree of damping. In some embodiments, the inlet 330 of the pneumatic supplemental damper 294 is in fluid communication with an air supply, not shown, located in the vehicle 12 to add air into the pneumatic supplemental damper 294. To release pressure within the pneumatic supplemental damper 294, a release valve 332 is activated in order to reduce the amount of damping. The air released may be recirculated back into the air supply provided in the vehicle 12 or released into the atmosphere. Thus, movement of the secondary seat back frame 58 may be reduced or increased as desired by the occupant by controlling the amount of pressure within the pneumatic supplemental damper 294.

Although not shown, it is appreciated that the supplemental dampers 294, 296 may be in communication with the electronic control unit 32 and operable via the user interface 24 for operating the amount of pressure within the supplemental dampers 294, 296. As noted above, the display unit 22 may include the user interface 24 and may be located in any suitable location, such as on the dashboard of the vehicle 12, or otherwise within reach of the occupant such that the occupant may control the degree of damping in the kinetic seat assembly 10. It is to be appreciated that the supplemental dampers 294, 296 may be operable between a Sport mode and a Comfort mode. When the occupant selects Sport mode, air may be released from the supplemental dampers 294, 296 in order to allow for more extension and retraction of the inner tube 312 with respect to the outer tube 306. Thus, the secondary seat back frame 58, as well as the secondary seat cushion frame 54 due to their connection by the linkage member 60, are permitted to move more freely. Alternatively, when the occupant selects Comfort mode, additional air is supplied in the supplemental dampers 294, 296 in order to increase the pressure therein and limit the amount of extension and retraction of the inner tube 312 with respect to the outer tube 306. Thus, the movement of the secondary seat back frame 58 and the secondary seat cushion frame 54 is damped.

In other embodiments, although not shown, it is understood that each supplemental damper 294, 296 may be an electric actuator, a hydraulic actuator, or any other suitable actuator for damping movement between the primary seat back frame 56 and the secondary seat back frame 58. Further, in some embodiments, as shown in FIG. 7, it is understood that a pair of supplemental dampers 295, 297 identical to the pair of supplemental dampers 294, 296 may be alternatively provided between the primary seat cushion frame 52 and the secondary seat cushion frame 54 in order to further damp movement of the secondary seat cushion frame 54.

Specifically, each supplemental damper 295, 297 is pivotally attached at a first end thereof to respective side members 66, 68 of the primary seat cushion frame 52 (FIG. 4) and to the rear bar 90 of the secondary seat cushion frame 54 at an opposite second end thereof. It is to be understood that each supplemental damper 294, 296 is identical in structure and, thus, only one supplemental damper 294 will be described in detail. Although not shown, it should be appreciated that the supplemental dampers 295, 297 include eye bolts at opposite ends thereof for pivotally attaching ends of the supplemental dampers 295, 297 to respective side members 66, 68 of the primary seat cushion frame 52 and to the rear bar 90.

Specifically, a first end 295A of the supplemental damper 295 is pivotally attached to the side member 66 (FIG. 4) of the primary seat cushion frame 52 and an opposite second end 295B of the supplemental damper 295 is pivotally attached to the rear bar 90 (FIG. 2) of the secondary seat cushion frame 54. Moreover, the supplemental damper 295 includes an outer tube 299 and an inner tube 301. The inner tube 301 and the outer tube 299 are permitted to rotate with respect to one another. Additionally, the inner tube 301 may extend and retract from the outer tube 299, but the inner tube 301 is restricted from retracting completely out of the outer tube 299. In use, the supplemental damper 295 operates to permit the inner tube 301 to slidably move in and out of the outer tube 299 in order to further damp the movement of the secondary seat cushion frame 54 with respect to the primary seat back frame 56.

In some embodiments, the supplemental damper 295 is a pneumatic actuator. As such, the pneumatic supplemental damper 295 includes an inlet 303 for connecting to an air supply. Air is supplied into the pneumatic supplemental damper 295, particularly the outer tube 299, to a predetermined amount to control the degree of damping. In some embodiments, the inlet 303 of the pneumatic supplemental damper 295 is in fluid communication with an air supply, not shown, located in the vehicle 12 to add air into the pneumatic supplemental damper 295. To release pressure within the pneumatic supplemental damper 295, a release valve 305 is activated in order to reduce the amount of damping. The air released may be recirculated back into the air supply provided in the vehicle 12 or released into the atmosphere. Thus, movement of the secondary seat cushion frame 54 may be reduced or increased as desired by the occupant by controlling the amount of pressure within the pneumatic supplemental damper 295.

Although not shown, it is appreciated that the supplemental dampers 295, 297 may be in communication with the electronic control unit 32 and operable via the user interface 24 for operating the amount of pressure within the supplemental dampers 295, 297. As noted above, the display unit 22 may include the user interface 24 and may be located in any suitable location, such as on the dashboard of the vehicle 12, or otherwise within reach of the occupant such that the occupant may control the degree of damping in the kinetic seat assembly 10. It is to be appreciated that the supplemental dampers 295, 297 may be operable between a Sport mode and a Comfort mode. When the occupant selects Sport mode, air may be released from the supplemental dampers 295, 297 in order to allow for more extension and retraction of the inner tube 312 with respect to the outer tube 306. Thus, the secondary seat cushion frame 54, as well as the secondary seat back frame 58 due to their connection by the linkage member 60, are permitted to move more freely. Alternatively, when the occupant selects Comfort mode, additional air is supplied in the supplemental dampers 295, 297 in order to increase the pressure therein and limit the amount of extension and retraction of the inner tube 301 with respect to the outer tube 299. Thus, the movement of the secondary seat cushion frame 54 and the secondary seat back frame 58 is damped.

In other embodiments, although not shown, it is understood that each supplemental damper 295, 297 may be an electric actuator, a hydraulic actuator, or any other suitable actuator for damping movement between the primary seat cushion frame 52 and the secondary seat cushion frame 54.

In use, the occupant controls the turning direction of the vehicle 12 by rotating the steering wheel 20. In doing so, the turning direction side shoulder of the occupant moves downward relative to the counter-turning direction side shoulder, and the turning direction side shoulder moves rearward relative to the counter-turning direction side shoulder. At this time, a steering operation can be comfortably performed if the occupant bends the lumbar spine in the turning direction and shortens a distance between the turning direction side pelvis and the shoulder compared to a distance between the counter-turning direction side pelvis and the shoulder, twists the lumbar spine, and pivotally moves the pelvis in the same direction as the turning direction side shoulder.

When the occupant directs the vehicle 12 in a turning direction, a force is applied onto the vehicle 12 and, thus, the occupant in the counter-turning direction. In a standard vehicle seat not equipped with moving to compensate for this force and allow the occupant to adjust a pelvis or torso position, the occupant will exhibit strain on these joints, including the knees, waist, and shoulders. In a seat in which the seat cushion frame and the seat back frame rotate in opposite directions, this strain on the occupant's joints is magnified.

The present disclosure seeks to eliminate these joint stresses by permitting the occupant seated in the kinetic seat assembly 10 to rotate with the force exhibited on the vehicle 12 during a turn. Thus, the present kinetic seat assembly 10 allows the pelvis and the torso of the occupant to rotate in order to maintain a center of gravity within the vehicle 12 in the direction of the turn.

As the occupant turns the vehicle 12 to the right, the occupant lowers the right shoulder and uses the trunk muscle so as to bend the lumbar spine to the right. This causes the occupant to pivotally move the pelvis counterclockwise in the rolling direction and clockwise in the yaw direction. In addition, the occupant pivotally moved the torso counterclockwise in the rolling direction and clockwise in the yaw direction. During a turn to the right, force is applied onto the occupant to the left. This further facilitates rotation of the torso and pelvis of the occupant to the left due to the momentum of the vehicle 12.

Figure 10:
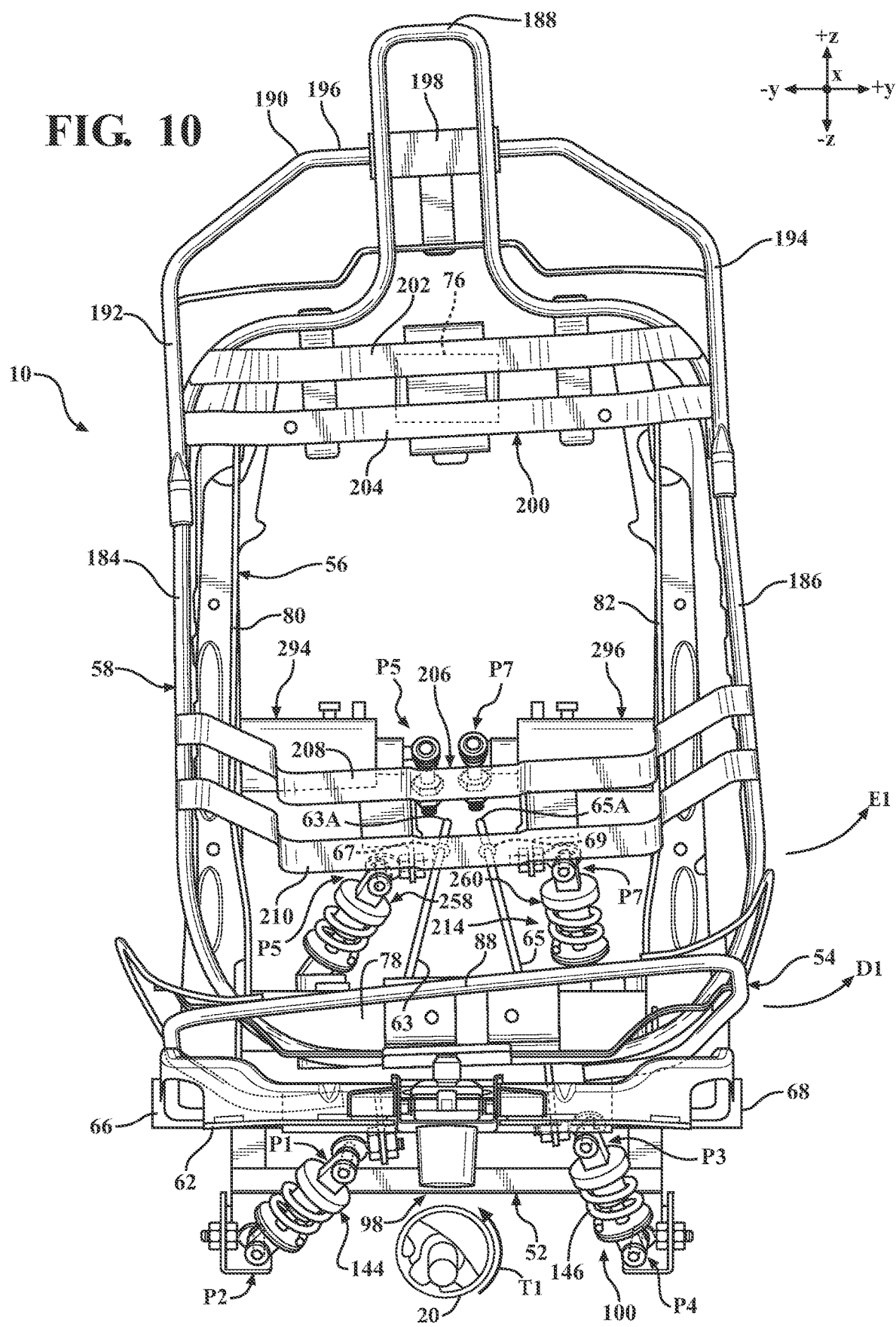
FIG. 10 schematically depicts a front view of the kinetic seat assembly of FIG. 1 during a right turn, according to one or more embodiments shown and described herein.

As shown in FIG. 10, the steering wheel 20 is turned in a first turning direction T1 in order to turn the vehicle to the right. In doing so, the front pivot mechanism 98 causes the secondary seat cushion frame 54 to pivot about the front pivot mechanism 98 and move in a first seat cushion direction D1. Similarly, due to the fact that the secondary seat cushion frame 54 and the secondary seat back frame 58 are coupled to one another by the linkage member 60, the secondary seat back frame 58 moves in a first seat back direction E1, which is generally in the same direction as the first seat cushion direction D1.

Figure 12:
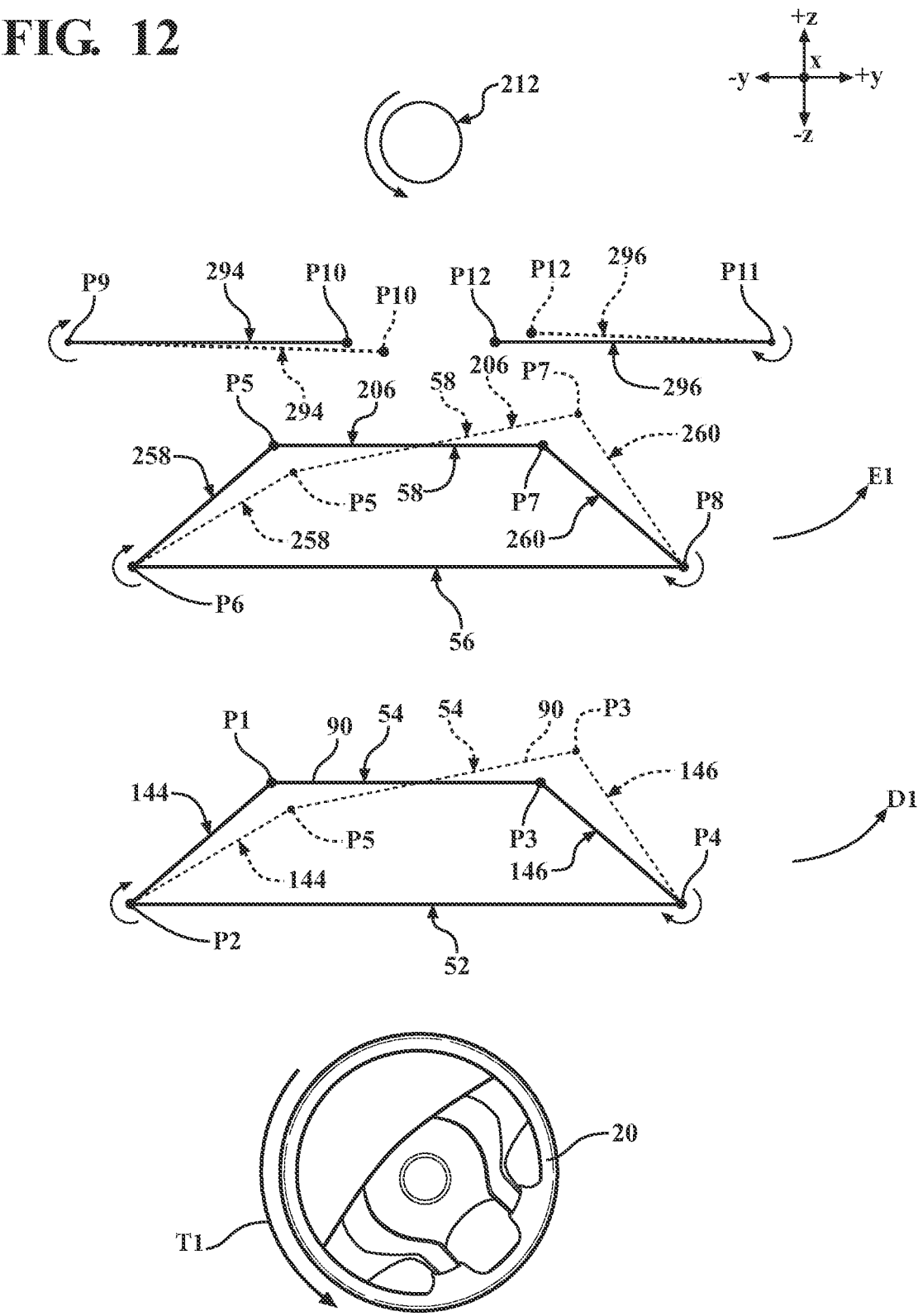
FIG. 12 schematically depicts a front view of movable pivots of the kinetic seat assembly of FIG. 1 during a right turn, according to one or more embodiments shown and described herein.

More particularly, as shown in FIG. 12, as the vehicle 12 turns to the right, force is applied in the opposite (left) direction. With respect to the rotation of the seat cushion dampers 144, 146 during a right turn, pivot P2, which rotates about axis C4 and axis C5 of the first seat cushion damper 144, rotates clockwise in the rolling direction. Similarly, pivot P4, which rotates about axes of the second seat cushion damper 146 corresponding to axis C4 and axis C5, rotates clockwise in the rolling direction. As a result, pivot P1, which rotates about axis C2 and axis C3 of the first seat cushion damper 144, is lowered and pivot P3, which rotates about axes of the second seat cushion damper 146 corresponding to axis C2 and axis C3, is raised. Thus, the rear bar 90, which is now shown as a dashed line, interconnects pivot P1 and pivot P3 and is angled after the turning operation of the vehicle 12 such that the counter-turning direction side of the rear bar 90 is higher than the turning direction side of the rear bar 90. This rotation of the secondary seat cushion frame 54 accommodates the lowering of the turning direction side of the occupant's pelvis and the raising of the counter-turning direction side of the occupant's pelvis.

In addition, as shown in FIG. 13, during a right turn, the seat cushion dampers 144, 146 rotate the turning direction side of the rear bar 90 to rotate away from the front pivot mechanism 98 and the counter-turning direction side of the rear bar 90 to rotate toward the front pivot mechanism 98. As shown, pivot P2 rotates counterclockwise in the yaw direction, thereby rotating pivot P1 away from the front pivot mechanism 98. Pivot P4 also rotates counterclockwise in the yaw direction in order to rotate pivot P3 toward the front pivot mechanism 98. This rotation of the secondary seat cushion frame 54 accommodates movement of the turning direction side of the occupant's pelvis rotating away from the front pivot mechanism 98 and the counter-turning direction side of the occupant's pelvis rotating toward front pivot mechanism 98. Thus, the pelvis of the occupant remains in contact with the secondary seat cushion frame 54 during a right turn as the momentum pushes the secondary seat cushion frame 54 and the occupant to the left.

As noted above, the linkage member 60 interconnects the secondary seat cushion frame 54 and the secondary seat back frame 58 at the rear bar 90 proximate the rear portion and the lower bar 182 proximate the lower portion, respectively. This results in the secondary seat back frame 58 moving simultaneously with the secondary seat cushion frame 54 and, thus, simultaneously and in the same direction.

Referring again to FIG. 12, now with respect to the rotation of the seat back dampers 258, 260 during a right turn, pivot P6, which rotates about axis B4 and axis B5 of the first seat back damper 258, rotates clockwise in the rolling direction. Similarly, pivot P8, which rotates about axes of the second seat back damper 260 corresponding to axis B4 and axis B5 rotates clockwise in the rolling direction. As a result, pivot P5, which rotates about axis B2 and axis B3 of the first seat back damper 258, is lowered and pivot P7, which rotates about axes of the second seat back damper 260 corresponding to axis B2 and axis B3, is raised. Thus, the lower brace 206, which is now shown as a dashed line, interconnects pivot P5 and pivot P7 and is angled after the turning operation of the vehicle 12 such that the counter-turning direction side of the lower brace 206 is higher than the turning direction side of the lower brace 206. This rotation of the secondary seat back frame 58 accommodates the lowering of the turning direction side of the occupant's shoulders and torso and the raising of the counter-turning direction side of the occupant's shoulders and torso.

In addition, as shown in FIG. 13, during a right turn, the seat back dampers 258, 260 rotate the turning direction side of the lower brace 206 to rotate away from the front pivot mechanism 98 and the counter-turning direction side of the lower brace 206 to rotate toward the front pivot mechanism 98. As shown, pivot P6 rotates counterclockwise in the yaw direction, thereby rotating pivot P5 away from the front pivot mechanism 98. Pivot P8 also rotates counterclockwise in the yaw direction in order to rotate pivot P7 toward the front pivot mechanism 98. This rotation of the secondary seat back frame 58 accommodates movement of the turning direction side of the occupant's torso and shoulders rotating away from the front pivot mechanism 98 and the counter-turning direction side of the occupant's torso and shoulders rotating toward the front pivot mechanism 98. Thus, the shoulders and the torso of the occupant remain in contact with the secondary seat back frame 58 during a right turn as the momentum pushes the secondary seat back frame 58 and the occupant to the left.

As noted above, during a right turn, the pair of the seat back dampers 258, 260 rotate the turning direction side of the lower brace 206 down and the counter-turning direction side of the lower brace 206 up. Thus, as shown in FIG. 12, in embodiments where the pair of supplemental dampers 294, 296 are employed on the secondary seat back frame 58, the first supplemental damper 294 rotates clockwise in the rolling direction about pivot P9, which rotates about axis A2 and axis A3 of the first supplemental damper 294, and the second supplemental damper 296 rotates clockwise in the rolling direction about pivot P11, which rotates about axes of the second supplemental damper 296 corresponding to axis A2 and axis A3. This rotation of the supplemental dampers 294, 296 lowers the turning direction side of the lower brace 206 and raises the counter-turning direction side of the lower brace 206. In doing so, the supplemental dampers 294, 296 extend or retract, as necessary, in order to extend or retract in length such that the first supplemental damper 294 maintains contact with pivot P9 and pivot P10 on the side member 80 and the lower brace 206, respectively, and the second supplemental damper 296 maintains contact with pivot P11 and pivot P12 on the side member 82 and the lower brace 206, respectively. It should be appreciated that pivot P10 rotates about axis A4 and axis A5 of the first supplemental damper 294 and pivot P12 rotates about axes of the second supplemental damper 296 corresponding to axis A4 and axis A5.

Moreover, as noted above, the turning direction side of the lower brace 206 of the secondary seat back frame 58 moves rearwardly with respect to the counter-turning direction side during a right turn. Thus, to accommodate this movement, as shown in FIG. 13, the first supplemental damper 294 rotates counterclockwise in the yaw direction about pivot P9 and the second supplemental damper 296 rotates counterclockwise in the yaw direction about pivot P11.

Figure 11:
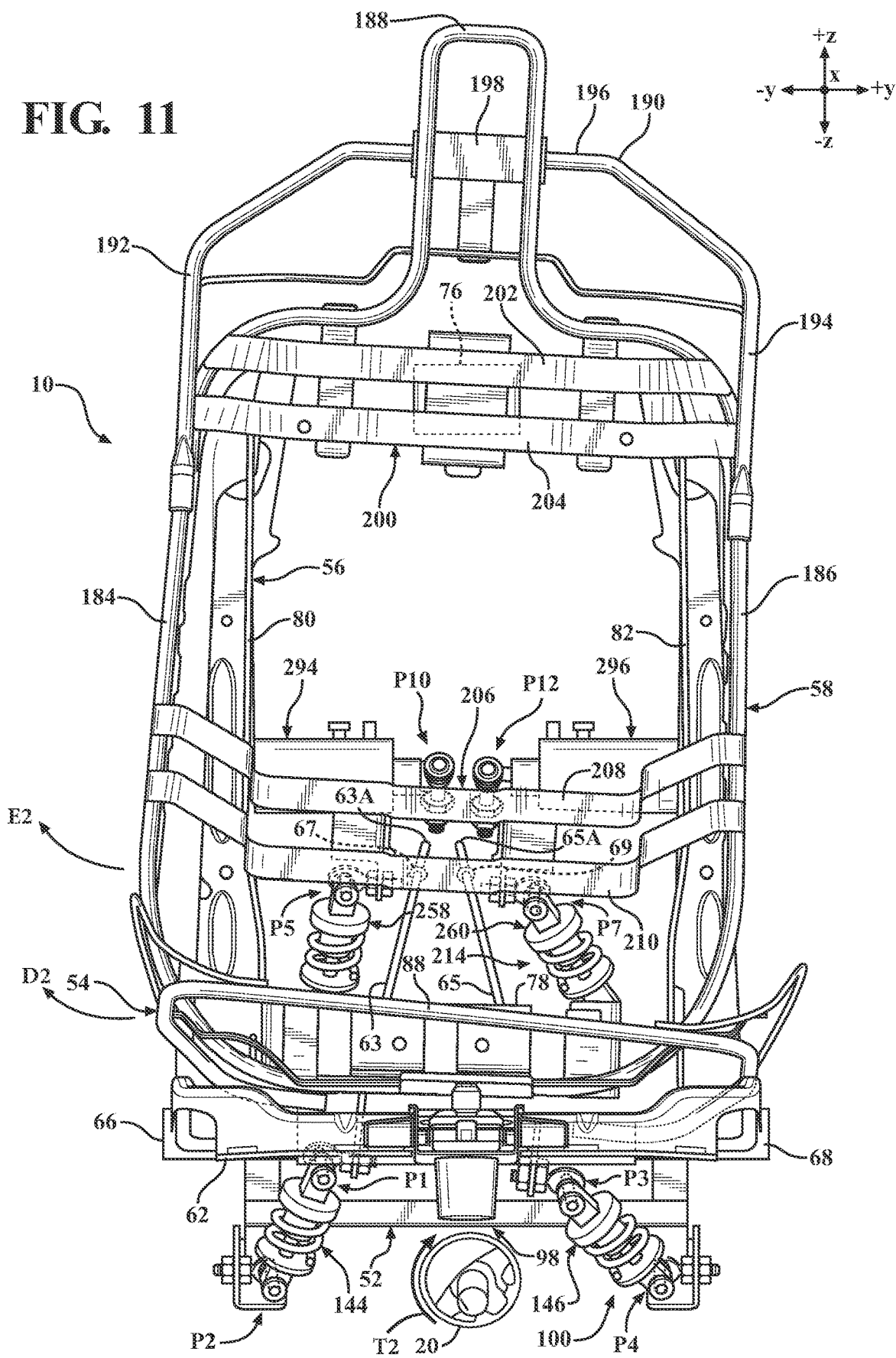
FIG. 11 schematically depicts a front view of the kinetic seat assembly of FIG. 1 during a left turn, according to one or more embodiments shown and described herein.

As shown in FIG. 11, the steering wheel 20 is turned in a second turning direction T2 in order to turn the vehicle to the left. In doing so, the front pivot mechanism 98 causes the secondary seat cushion frame 54 to pivot about the front pivot mechanism 98 and move in a second seat cushion direction D2. Similarly, due to the fact that the secondary seat cushion frame 54 and the secondary seat back frame 58 are coupled to one another by the linkage member 60, the secondary seat back frame 58 moves in a second seat back direction E2, which is generally in the same direction as the second seat cushion direction D2.

Figure 14:
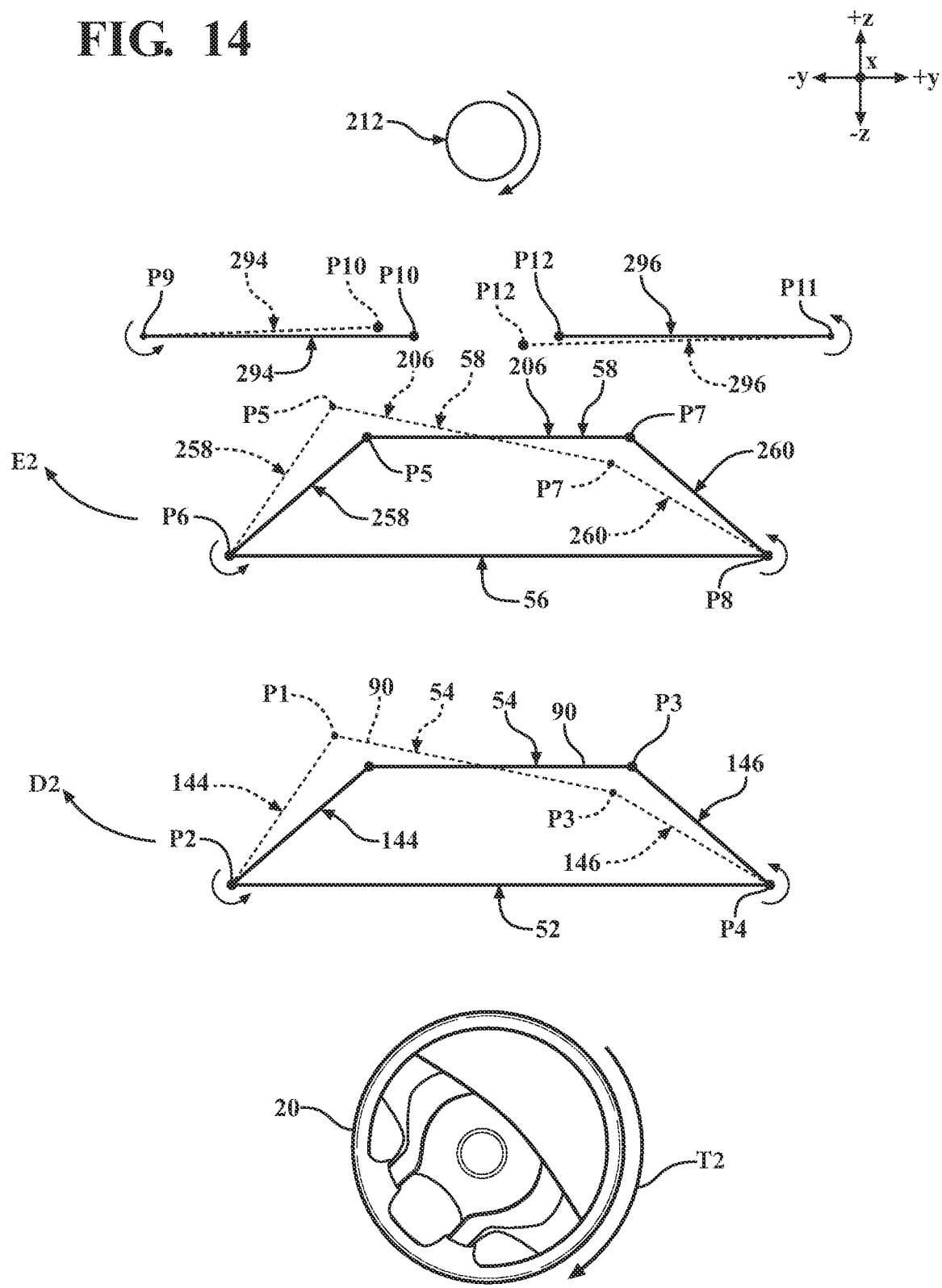
FIG. 14 schematically depicts a front view of the movable pivots of the kinetic seat assembly of FIG. 1 during a left turn, according to one or more embodiments shown and described herein.

More particularly, as shown in FIG. 14, as the vehicle 12 turns to the left, force is applied in the opposite (right) direction. With respect to the rotation of the seat cushion dampers 144, 146 during a left turn, pivot P2 rotates counterclockwise in the rolling direction. Similarly, pivot P4 rotates counterclockwise in the rolling direction. As a result, pivot P3 is lowered and pivot P1 is raised. Thus, the rear bar 90, which is now shown as a dashed line, interconnects pivot P1 and pivot P3 and is angled after the turning operation of the vehicle 12 such that the counter-turning direction side of the rear bar 90 is lower than the turning direction side of the rear bar 90. This rotation of the secondary seat cushion frame 54 accommodates the raising of the turning direction side of the occupant's pelvis and the lowering of the counter-turning direction side of the occupant's pelvis.

In addition, as shown in FIG. 15, during a left turn, the seat cushion dampers 144, 146 rotate the turning direction side of the rear bar 90 to rotate toward the front pivot mechanism 98 and the counter-turning direction side of the rear bar 90 to rotate away from the front pivot mechanism 98. As shown, pivot P2 rotates clockwise in the yaw direction, thereby rotating pivot P1 toward the front pivot mechanism 98. Pivot P4 also rotates clockwise in the yaw direction in order to rotate pivot P3 away from the front pivot mechanism 98. This rotation of the secondary seat cushion frame 54 accommodates movement of the turning direction side of the occupant's pelvis rotating away from the front pivot mechanism 98 and the counter-turning direction side of the occupant's pelvis rotating toward the front pivot mechanism 98. Thus, the pelvis of the occupant remains in contact with the secondary seat cushion frame 54 frame during a left turn as the momentum pushes the secondary seat back frame 58 and the occupant to the right.

Again, the linkage member 60 interconnects the secondary seat cushion frame 54 with the secondary seat back frame 58 causing both to move in phase and, thus, simultaneously with one another and in the same direction. Thus, with respect to the rotation of the seat back dampers 258, 260 during a left turn, as shown in FIG. 14, pivot P6 rotates counterclockwise in the rolling direction. Similarly, pivot P8 rotates counterclockwise in the rolling direction. As a result, pivot P5 is raised and pivot P7 is lowered. Thus, the lower brace 206, which is now shown as a dashed line, interconnects pivot P5 and pivot P7 and is angled after the turning operation of the vehicle 12 such that the counter-turning direction side of the lower brace 206 is higher than the turning direction side of the lower brace 206. This rotation of the secondary seat back frame 58 accommodates the lowering of the turning direction side of the occupant's shoulders and torso and the raising of the counter-turning direction side of the occupant's shoulders and torso.

In addition, as shown in FIG. 15, during a left turn, the seat back dampers 258, rotate the turning direction side of the lower brace 206 to rotate away from the front pivot mechanism 98 and the counter-turning direction side of the lower brace 206 to rotate toward the front pivot mechanism 98. As shown, pivot P6 rotates clockwise in the yaw direction, thereby rotating pivot P5 toward from the front pivot mechanism 98. Pivot P8 also rotates clockwise in the yaw direction in order to rotate pivot P7 away from the front pivot mechanism 98. This rotation of the secondary seat back frame 58 accommodates movement of the turning direction side of the occupant's torso and shoulders rotating away from the front pivot mechanism 98 and the counter-turning direction side of the occupant's torso and shoulders rotating toward the front pivot mechanism 98. Thus, the shoulders and the torso of the occupant remain in contact with the secondary seat back frame 58 during a left turn as the momentum pushes the secondary seat back frame 58 and the occupant to the right.

As noted above, during a left turn, the pair of the seat back dampers 258, 260 rotate the turning direction side of the lower brace 206 down and the counter-turning direction side of the lower brace 206 up. Thus, as shown in FIG. 14, in embodiments where the pair of supplemental dampers 294, 296 are employed on the secondary seat back frame 58, the first supplemental damper 294 rotates counterclockwise in the rolling direction about pivot P9 and the second supplemental damper 296 rotates counterclockwise in the rolling direction about pivot P11. This rotation of the supplemental dampers 294, 296 lowers the turning direction side of the lower brace 206 and raises the counter-turning direction side of the lower brace 206. In doing so, the supplemental dampers 294, 296 extend or retract, as necessary, in order to extend or retract in length such that the first supplemental damper 294 maintains contact with pivot P9 and pivot P10 on the side member 80 and the lower brace 206, respectively, and the second supplemental damper 296 maintains contact with pivot P11 and pivot P12 on the side member 82 and the lower brace 206, respectively.

Moreover, as noted above, the turning direction side of the lower brace 206 of the secondary seat back frame 58 moves rearwardly with respect to the counter-turning direction side during a left turn. Thus, to accommodate this movement, the first supplemental damper 294 rotates clockwise in the yaw direction about pivot P9 and the second supplemental damper 296 rotates counterclockwise in the yaw direction about pivot P11.

Referring now to operation of the front pivot mechanism 98 while in use, it should be appreciated that the front pivot mechanism 98 operates to allow a front portion of the secondary seat cushion frame 54 to rotate and to produce a damping effect between movement of the secondary seat cushion frame 54 with respect to the primary seat cushion frame 52. As shown in FIG. 13, when the vehicle 12 makes a right turn, the front pivot mechanism 98 rotates clockwise in the yaw direction. To the contrary, when the vehicle 12 makes a left turn, as shown in FIG. 15, the front pivot mechanism 98 rotates counterclockwise in the yaw direction.

However, the operation of the damping effect is the same regardless of the whether the vehicle is driving straight or turning to the right or to the left. As such, the front pivot mechanism 98 seeks to damp vibration of the secondary seat cushion frame 54 along the Z-axis. In use, as shown in FIG. 6, upward force on the primary seat cushion frame 52 or downward force on the secondary seat cushion frame 54 causes the pivotable arm 102 to pivot toward the fixed arm 104, thereby moving the secondary seat cushion frame 54 toward the primary seat cushion frame 52 along the Z-axis. As the primary seat cushion frame 52 and the secondary seat cushion frame 54 are brought closer together, the biasing member 130 disposed between the pivotable arm 102 and the fixed arm 104 is compressed. This increase in compression of the biasing member 130 reduces the length thereof and decreases the damping effect between the secondary seat cushion frame 54 and the primary seat cushion frame 52. The biasing member 130 maintains its degree of compression until the force of the biasing member 130 becomes greater than the amount of downward force on the secondary seat cushion frame 54 or upward force acting on the primary seat cushion frame 52. Thereafter, the biasing member 130 returns to its original, extended position and forces the secondary seat cushion frame 54 to return to its raised position with respect to the primary seat cushion frame 52.

It should be appreciated that the biasing member 130 damping vibration of the secondary seat cushion frame 54 allows the secondary seat cushion frame 54 to move more freely along the Z-axis. Doing so allows the secondary seat cushion frame 54 to absorb shocks experienced by the vehicle 12 while driving over a rough terrain or during harsh accelerating or braking. This may be desirable by occupants in some instances. However, occupants may wish to have more control over the degree of damping. Therefore, as noted above, in some embodiments, the damping effect of the front pivot mechanism 98 may be increased or decreased in order to provide a specific desired effect by the occupant. For example, it may be desirable by an occupant not traveling over rough terrain that the front pivot mechanism 98 provide less of a damping effect. In this case, the occupant would rotate the rotatable member 132, or handle 142 secured to the rotatable member 132 if provided.

Rotating the handle 142 in a first direction similarly rotates the threaded shaft 118 in the same first direction. As noted above, the traversing plate 134 is threadedly situated around the threaded shaft 118. However, as the threaded shaft 118 rotates, the anti-rotation plate 140 prevents rotation of the traversing plate 134. More particularly, the anti-rotation plate 140 extends toward the pivotable arm 102 from the fixed arm 104 and is in close proximity to the planar contact surface 138 of the traversing plate 134. Thus, as the threaded shaft 118 rotates, rotation of the traversing plate 134 is prevented as the planar contact surface 138 thereof contacts the anti-rotation plate 140. As a result, the traversing plate 134 is screwed further onto the threaded shaft 118 toward the pivotable arm 102, thereby increasing compression of the biasing member 130 and reducing a length thereof. As the compression of the biasing member 130 is increased, a greater force opposite the fixed arm 104 is applied to the pivotable arm 102. This reduces the degree to which the pivotable arm 102 biases toward the fixed arm 104 and decreases the damping effect of the front pivot mechanism 98.

Alternatively, rotating the handle 142 in an opposite second direction similarly rotates the threaded shaft 118 in the same second direction. As the threaded shaft 118 rotates, the anti-rotation plate 140 prevents rotation of the traversing plate 134. As a result, the traversing plate 134 traverses the threaded shaft 118 and moves away from the pivotable arm 102, thereby increasing the length of the biasing member 130 and decreasing compression thereof. As the compression of the biasing member 130 is decreased, less force opposite the fixed arm 104 is applied to the pivotable arm 102. This allows the pivotable arm 102 to bias toward the fixed arm 104 to a greater degree and increases the damping effect of the front pivot mechanism 98.

Referring now to operation of the upper pivot mechanism 212 while in use, it should be appreciated that the upper pivot mechanism operates 212 to allow the upper portion of the secondary seat back frame to rotate and to produce a damping effect between movement of the secondary seat back frame 58 with respect to the primary seat back frame 56. As shown in FIG. 12, when the vehicle 12 makes a right turn, the upper pivot mechanism 212 rotates counterclockwise in the rolling direction. To the contrary, when the vehicle 12 makes a left turn, as shown in FIG. 14, the upper pivot mechanism 212 rotates clockwise in the rolling direction.

However, the operation of the damping effect is the same regardless of the whether the vehicle is driving straight or turning to the right or to the left. As such, the front pivot mechanism 98 seeks to damp vibration of the secondary seat back frame 58 along the X-axis. In use, as shown in FIG. 8, forward force on the primary seat back frame 56 or rearward force on the secondary seat back frame 58 causes the pivotable arm 216 to pivot toward the fixed arm 218, thereby moving the secondary seat back frame 58 toward the primary seat back frame 56 along the X-axis. As the primary seat back frame 56 and the secondary seat back frame 58 are brought closer together, the biasing member 244 disposed between the pivotable arm 216 and the fixed arm 218 is compressed. This increase in compression of the biasing member 244 decreases the damping effect of the secondary seat back frame 58 with respect to the primary seat back frame 56. The biasing member 244 maintains its degree of compression until the force of the biasing member 244 becomes greater than the amount of rearward force on the secondary seat back frame 58 or forward force acting on the primary seat back frame 56. Thereafter, the biasing member 244 returns to its original, extended position and forces the secondary seat back frame 58 to return to its upright position with respect to the primary seat back frame 56.

It should be appreciated that the biasing member 244 damping vibration of the secondary seat back frame 58 allows the secondary seat back frame 58 to move more freely along the X-axis. Doing so allows the secondary seat back frame 58 to absorb shocks experienced by the vehicle 12 while driving over a rough terrain or during harsh accelerating or braking. This may be desirable by occupants in some instances. However, occupants may wish to have more control over the degree of damping. Therefore, as noted above, in some embodiments, the damping effect of the upper pivot mechanism 212 may be increased or decreased in order to provide a specific desired effect by the occupant. For example, it may be desirable by an occupant not traveling over rough terrain that the upper pivot mechanism 212 provide less of a damping effect. In this case, the occupant would rotate the rotatable member 246, or handle 256 secured to the rotatable member 246 if provided.

Rotating the handle 256 in a first direction similarly rotates the threaded shaft 232 in the same first direction. As noted above, the traversing plate 248 is threadedly situated around the threaded shaft 232. However, as the threaded shaft 232 rotates, the anti-rotation plate 254 prevents rotation of the traversing plate 248. More particularly, the anti-rotation plate 254 extends toward the pivotable arm 216 from the fixed arm 218 and is in close proximity to the planar contact surface 252 of the traversing plate 248. Thus, as the threaded shaft 232 rotates, rotation of the traversing plate 248 is prevented as the planar contact surface 252 thereof contacts the anti-rotation plate 254. As a result, the traversing plate 248 is screwed further onto the threaded shaft 232 toward the pivotable arm 216, thereby reducing the length of the biasing member 244 and increasing compression thereof. As the compression of the biasing member 244 is increased, a greater force opposite the fixed arm 218 is applied to the pivotable arm 216. This reduces the degree to which the pivotable arm 216 biases toward the fixed arm 218 and decreases the damping effect of the upper pivot mechanism 212.

Alternatively, rotating the handle 256 in an opposite second direction similarly rotates the threaded shaft 232 in the second direction. As the threaded shaft 232 rotates, the anti-rotation plate 254 prevents rotation of the traversing plate 248. As a result, the traversing plate 248 traverses the threaded shaft 232 and moves away from the pivotable arm 216, thereby increasing the length of the biasing member 244 and decreasing compression thereof. As the compression of the biasing member 244 decreases, less force opposite the fixed arm 218 is applied to the pivotable arm 216. This allows the pivotable arm 216 to bias toward the fixed arm 218 to a greater degree and increases the damping effect of the upper pivot mechanism 212.

Referring again to FIG. 1, an imaginary line L extends from the front pivot mechanism 98 to the upper pivot mechanism 212. With respect to an occupant seated in the kinetic seat assembly 10, the line L generally extends through the shoulders of the occupant and the knees of the occupant. Thus, during use of the kinetic seat assembly 10, when undergoing movement during a right turn or a left turn, the kinetic seat assembly 10 ensures that the shoulders of the occupant and the knees of the occupant remain generally aligned with one another while allowing the occupant's waist to move in respective left and right directions in accordance with the above disclosure.

From the above, it is to be appreciated that defined herein is a new and unique kinetic seat assembly in which a seat cushion frame and a seat back frame rotate in phase with one another during movement of a vehicle, such as a turn. In doing so, the driver of the vehicle, or other occupant when the kinetic vehicle seat replaces a seat of a vehicle other than the driver seat, experiences a more comfortable driving experience in which the occupant's torso and waist move together.

Clause 1. A kinetic seat assembly comprising: a primary seat cushion frame; a primary seat back frame; a secondary seat cushion frame pivotally connected to the primary seat cushion frame; a secondary seat back frame pivotally connected to the primary seat back frame; a front pivot mechanism for damping movement between the primary seat cushion frame and the secondary seat cushion frame in a kinetic seat vertical direction; and an upper pivot mechanism for damping movement between the primary seat back frame and the secondary seat back frame in a kinetic seat longitudinal direction.

Clause 2. The kinetic seat assembly of clause 1, wherein, in a first turning direction, the secondary seat cushion frame moves in a first seat cushion direction with respect to the primary seat cushion frame, and the secondary seat back frame moves in a first seat back direction with respect to the primary seat back frame, the first seat cushion direction being in phase with the first seat back direction.

Clause 3. The kinetic seat assembly of clause 1 or clause 2, wherein, in a second turning direction opposite the first turning direction, the secondary seat cushion frame moves in a second seat cushion direction with respect to the primary seat cushion frame, and the secondary seat back frame moves in a second seat back direction with respect to the primary seat back frame, the second seat cushion direction being in phase with the second seat back direction, wherein the first seat cushion direction is opposite the second seat cushion direction, and the first seat back direction is opposite the second seat back direction.

Clause 4. The kinetic seat assembly of any of clauses 1-3, further comprising a linkage member interconnecting a lower portion of the secondary seat back frame to a rear portion of the secondary seat cushion frame, the linkage member restricting movement of the secondary seat back frame and the secondary seat cushion frame to being in phase with one another.

Clause 5. The kinetic seat assembly of any of clauses 1-4, wherein the linkage member comprises a pair of struts, each strut having a first end pivotally coupled to the secondary seat back frame and an opposite second end pivotally coupled to the secondary seat cushion frame.

Clause 6. The kinetic seat assembly of any of clauses 1-5, wherein the upper pivot mechanism includes a ball joint pivotally coupling the primary seat back frame to the secondary seat back frame.

Clause 7. The kinetic seat assembly of any of clauses 1-6, wherein the front pivot mechanism includes a ball joint pivotally coupling the primary seat cushion frame to the secondary seat cushion frame.

Clause 8. The kinetic seat assembly of any of clauses 1-7, further comprising a seat back tilt mechanism coupling the secondary seat back frame to the primary seat back frame such that the secondary seat back frame is movable with respect to the primary seat back frame.

Clause 9. The kinetic seat assembly of any of clauses 1-8, further comprising a seat cushion tilt mechanism coupling the secondary seat cushion frame to the primary seat cushion frame such that the secondary seat cushion frame is movable with respect to the primary seat cushion frame.

Clause 10. The kinetic seat assembly of any of clauses 1-9, further comprising: a pair of supplemental seat back dampers, each of the supplemental seat back dampers including a first end pivotally coupled to the primary seat back frame and an opposite second end pivotally coupled to the secondary seat back frame, the pair of supplemental seat back dampers configured to control an amount of movement of the secondary seat back frame with respect to the primary seat back frame; and a pair of supplemental seat cushion dampers, each of the supplemental seat cushion dampers including a first end pivotally coupled to the primary seat cushion frame and an opposite second end pivotally coupled to the secondary seat cushion frame, the pair of supplemental seat cushion dampers configured to control an amount of movement of the secondary seat cushion frame with respect to the primary seat cushion frame.

Clause 11. A vehicle comprising: a passenger compartment; and a kinetic seat assembly within the passenger compartment, the kinetic seat assembly including: a primary seat cushion frame; a primary seat back frame; a secondary seat cushion frame pivotally connected to the primary seat cushion frame; a secondary seat back frame pivotally connected to the primary seat back frame; a front pivot mechanism for damping movement between the primary seat cushion frame and the secondary seat cushion frame in a kinetic seat vertical direction; and an upper pivot mechanism for damping movement between the primary seat back frame and the secondary seat back frame in a kinetic seat longitudinal direction.

Clause 12. The vehicle of clause 11, wherein, in a first turning direction, the secondary seat cushion frame moves in a first seat cushion direction with respect to the primary seat cushion frame, and the secondary seat back frame moves in a first seat back direction with respect to the primary seat back frame, the first seat cushion direction being in phase with the first seat back direction.

Clause 13. The vehicle of clauses 11 or clause 12, wherein, in a second turning direction opposite the first turning direction, the secondary seat cushion frame moves in a second seat cushion direction with respect to the primary seat cushion frame, and the secondary seat back frame moves in a second seat back direction with respect to the primary seat back frame, the second seat cushion direction being in phase with the second seat back direction, wherein the first seat cushion direction is opposite the second seat cushion direction, and the first seat back direction is opposite the second seat back direction.

Clause 14. The vehicle of any of clauses 11-13, further comprising a linkage member interconnecting a lower portion of the secondary seat back frame to a rear portion of the secondary seat cushion frame, the linkage member restricting movement of the secondary seat back frame and the secondary seat cushion frame to being in phase with one another.

Clause 15. The vehicle of any of clauses 11-14, wherein the linkage member comprises a pair of struts, each strut having a first end pivotally coupled to the secondary seat back frame and an opposite second end pivotally coupled to the secondary seat cushion frame.

Clause 16. The vehicle of any of clauses 11-15, wherein the upper pivot mechanism includes a ball joint pivotally coupling the primary seat back frame to the secondary seat back frame.

Clause 17. The vehicle of any of clauses 11-16, wherein the front pivot mechanism includes a ball joint pivotally coupling the primary seat cushion frame to the secondary seat cushion frame.

Clause 18. The vehicle of any of clauses 11-17, further comprising a seat back tilt mechanism coupling the secondary seat back frame to the primary seat back frame such that the secondary seat back frame is movable with respect to the primary seat back frame.

Clause 19. The vehicle of any of clauses 11-18, further comprising a seat cushion tilt mechanism coupling the secondary seat cushion frame to the primary seat cushion frame such that the secondary seat cushion frame is movable with respect to the primary seat cushion frame.

Clause 20. The vehicle of any of clauses 11-19, further comprising: a pair of supplemental seat back dampers, each of the supplemental seat back dampers including a first end pivotally coupled to the primary seat back frame and an opposite second end pivotally coupled to the secondary seat back frame, the pair of supplemental seat back dampers configured to control an amount of movement of the secondary seat back frame with respect to the primary seat back frame; and a pair of supplemental seat cushion dampers, each of the supplemental seat cushion dampers including a first end pivotally coupled to the primary seat cushion frame and an opposite second end pivotally coupled to the secondary seat cushion frame, the pair of supplemental seat cushion dampers configured to control an amount of movement of the secondary seat cushion frame with respect to the primary seat cushion frame.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A kinetic seat assembly comprising:
   a primary seat cushion frame;
   a primary seat back frame;
   a secondary seat cushion frame pivotally connected to the primary seat cushion frame;
   a secondary seat back frame pivotally connected to the primary seat back frame; and
   a linkage member interconnecting the secondary seat back frame to the secondary seat cushion frame, the linkage member restricting movement of the secondary seat back frame and the secondary seat cushion frame to being in phase with one another.

2. The kinetic seat assembly of claim 1, wherein, in a first turning direction, the secondary seat cushion frame moves in a first seat cushion direction with respect to the primary seat cushion frame, and the secondary seat back frame moves in a first seat back direction with respect to the primary seat back frame, the first seat cushion direction being in phase with the first seat back direction.

3. The kinetic seat assembly of claim 2, wherein, in a second turning direction opposite the first turning direction, the secondary seat cushion frame moves in a second seat cushion direction with respect to the primary seat cushion frame, and the secondary seat back frame moves in a second seat back direction with respect to the primary seat back frame, the second seat cushion direction being in phase with the second seat back direction,
   wherein the first seat cushion direction is opposite the second seat cushion direction, and the first seat back direction is opposite the second seat back direction.

4. The kinetic seat assembly of claim 1, wherein the linkage member interconnects a lower portion of the secondary seat back frame to a rear portion of the secondary seat cushion frame.

5. The kinetic seat assembly of claim 4, wherein the linkage member comprises a pair of struts, each strut having a first end pivotally coupled to the secondary seat back frame and an opposite second end pivotally coupled to the secondary seat cushion frame.

6. The kinetic seat assembly of claim 1, wherein an upper pivot mechanism pivotally couples the primary seat back frame and the secondary seat back frame, the upper pivot mechanism includes a ball joint pivotally coupling the primary seat back frame to the secondary seat back frame.

7. The kinetic seat assembly of claim 6, wherein a front pivot mechanism pivotally couples the primary seat cushion frame and the secondary seat cushion frame, the front pivot mechanism includes a ball joint pivotally coupling the primary seat cushion frame to the secondary seat cushion frame.

8. The kinetic seat assembly of claim 1, further comprising a seat back tilt mechanism coupling the secondary seat back frame to the primary seat back frame such that the secondary seat back frame is movable with respect to the primary seat back frame.

9. The kinetic seat assembly of claim 8, further comprising a seat cushion tilt mechanism coupling the secondary seat cushion frame to the primary seat cushion frame such that the secondary seat cushion frame is movable with respect to the primary seat cushion frame.

10. The kinetic seat assembly of claim 1, further comprising:
   a pair of supplemental seat back dampers, each of the supplemental seat back dampers including a first end pivotally coupled to the primary seat back frame and an opposite second end pivotally coupled to the secondary seat back frame, the pair of supplemental seat back dampers configured to control an amount of movement of the secondary seat back frame with respect to the primary seat back frame; and
   a pair of supplemental seat cushion dampers, each of the supplemental seat cushion dampers including a first end pivotally coupled to the primary seat cushion frame and an opposite second end pivotally coupled to the secondary seat cushion frame, the pair of supplemental seat cushion dampers configured to control an amount of movement of the secondary seat cushion frame with respect to the primary seat cushion frame.

11. A vehicle comprising:
   a passenger compartment; and
   a kinetic seat assembly within the passenger compartment, the kinetic seat assembly including:
      a primary seat cushion frame;
      a primary seat back frame;
      a secondary seat cushion frame pivotally connected to the primary seat cushion frame;
      a secondary seat back frame pivotally connected to the primary seat back frame; and
      a linkage member interconnecting the secondary seat back frame to the secondary seat cushion frame, the linkage member restricting movement of the secondary seat back frame and the secondary seat cushion frame to being in phase with one another.

12. The vehicle of claim 11, wherein, in a first turning direction, the secondary seat cushion frame moves in a first seat cushion direction with respect to the primary seat cushion frame, and the secondary seat back frame moves in a first seat back direction with respect to the primary seat back frame, the first seat cushion direction being in phase with the first seat back direction.

13. The vehicle of claim 12, wherein, in a second turning direction opposite the first turning direction, the secondary seat cushion frame moves in a second seat cushion direction with respect to the primary seat cushion frame, and the secondary seat back frame moves in a second seat back direction with respect to the primary seat back frame, the second seat cushion direction being in phase with the second seat back direction,
   wherein the first seat cushion direction is opposite the second seat cushion direction, and the first seat back direction is opposite the second seat back direction.

14. The vehicle of claim 11, wherein the linkage member interconnects a lower portion of the secondary seat back frame to a rear portion of the secondary seat cushion frame.

15. The vehicle of claim 14, wherein the linkage member comprises a pair of struts, each strut having a first end pivotally coupled to the secondary seat back frame and an opposite second end pivotally coupled to the secondary seat cushion frame.

16. The vehicle of claim 11, wherein an upper pivot mechanism pivotally couples the primary seat back frame and the secondary seat back frame, the upper pivot mechanism includes a ball joint pivotally coupling the primary seat back frame to the secondary seat back frame.

17. The vehicle of claim 16, wherein the front pivot mechanism pivotally couples the primary seat cushion frame and the secondary seat cushion frame, the front pivot mechanism includes a ball joint pivotally coupling the primary seat cushion frame to the secondary seat cushion frame.

18. The vehicle of claim 11, further comprising a seat back tilt mechanism coupling the secondary seat back frame to the primary seat back frame such that the secondary seat back frame is movable with respect to the primary seat back frame.

19. The vehicle of claim 18, further comprising a seat cushion tilt mechanism coupling the secondary seat cushion frame to the primary seat cushion frame such that the secondary seat cushion frame is movable with respect to the primary seat cushion frame.

20. The vehicle of claim 11, further comprising:
   a pair of supplemental seat back dampers, each of the supplemental seat back dampers including a first end pivotally coupled to the primary seat back frame and an opposite second end pivotally coupled to the secondary seat back frame, the pair of supplemental seat back dampers configured to control an amount of movement of the secondary seat back frame with respect to the primary seat back frame; and
   a pair of supplemental seat cushion dampers, each of the supplemental seat cushion dampers including a first end pivotally coupled to the primary seat cushion frame and an opposite second end pivotally coupled to the secondary seat cushion frame, the pair of supplemental seat cushion dampers configured to control an amount of movement of the secondary seat cushion frame with respect to the primary seat cushion frame.

* * * * *